United States Patent
Kennedy et al.

(10) Patent No.: US 12,122,942 B2
(45) Date of Patent: Oct. 22, 2024

(54) P-DOPED SURFACE COATINGS AND PROCESS OF PREPARATION THEREOF

(71) Applicant: Kastus Technologies DAC, Dublin (IE)

(72) Inventors: James Kennedy, Dublin (IE); Nigel Leyland, Dublin (IE)

(73) Assignee: Kastus Technologies DAC, Dublin (IE)

( * ) Notice: Subject to any disclaimer, the term of this patent is extended or adjusted under 35 U.S.C. 154(b) by 657 days.

(21) Appl. No.: 17/311,969

(22) PCT Filed: Dec. 5, 2019

(86) PCT No.: PCT/EP2019/083778
§ 371 (c)(1),
(2) Date: Jun. 8, 2021

(87) PCT Pub. No.: WO2020/120272
PCT Pub. Date: Jun. 18, 2020

(65) Prior Publication Data
US 2022/0025194 A1    Jan. 27, 2022

(30) Foreign Application Priority Data

Dec. 10, 2018  (GB) ...................................... 1820094
Mar. 5, 2019   (CO) ........................ NC2019/0002089
May 7, 2019   (OM) ..................... OM/P/2019/00192
Jun. 20, 2019  (TW) ................................ 108121577

(51) Int. Cl.
*C09D 7/80*   (2018.01)
*C09D 5/14*   (2006.01)
*C09D 7/61*   (2018.01)
*C09D 7/63*   (2018.01)

(52) U.S. Cl.
CPC .................. *C09D 7/80* (2018.01); *C09D 5/14* (2013.01); *C09D 7/61* (2018.01); *C09D 7/63* (2018.01)

(58) Field of Classification Search
CPC ... C09D 7/80; C09D 5/14; C09D 7/61; C09D 7/63; C09D 1/00
See application file for complete search history.

(56) References Cited

U.S. PATENT DOCUMENTS

| 8,551,909 B2 | 10/2013 | Etacheri et al. |
| 2013/0122074 A1 | 5/2013 | Kerrod et al. |
| 2015/0164081 A1 | 6/2015 | Ryan et al. |

FOREIGN PATENT DOCUMENTS

| JP | 2009 185366 | 8/2009 |
| KR | 2006 0036012 | 4/2006 |

OTHER PUBLICATIONS

Lv et al., "Preparation, characterization of P-doped Ti02 nanoparticles and their excellent photocatalystic properties under the solar light irradiation," Journal of Alloys and Compounds, vol. 488, No. 1, Nov. 20, 2009, pp. 314-319.
International Search Report and Written Opinion issued in PCT/EP2019/083778, mailed Apr. 14, 2020, 16 pages.

*Primary Examiner* — Anthony J Green
(74) *Attorney, Agent, or Firm* — Faegre Drinker Biddle & Reath LLP

(57) ABSTRACT

A process for the preparation of an antimicrobial P-doped coating solution is described. The process for the preparation of the antimicrobial coating solution uses non-volatile and non-oxidising phosphoric acid. The antimicrobial coatings are active in both the UV and visible light spectrum.

16 Claims, 21 Drawing Sheets

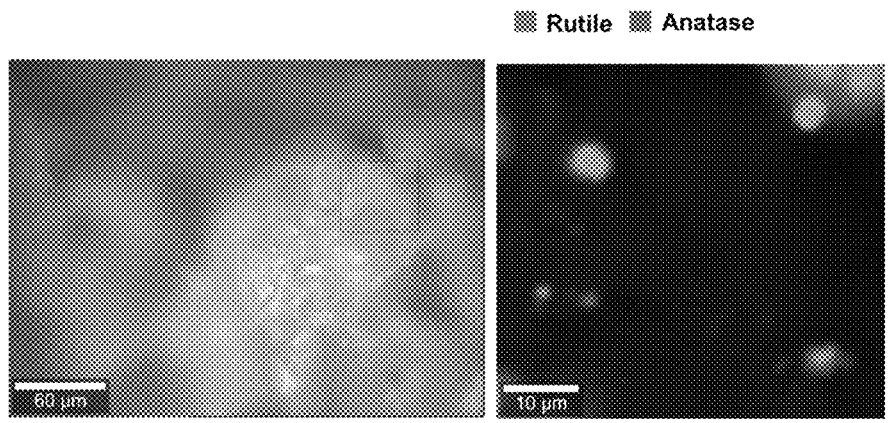
Figure 10a
Figure 10b
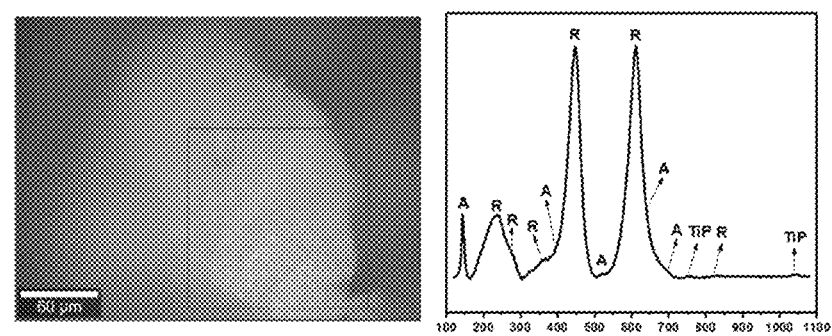
Figure 11a
Figure 11b
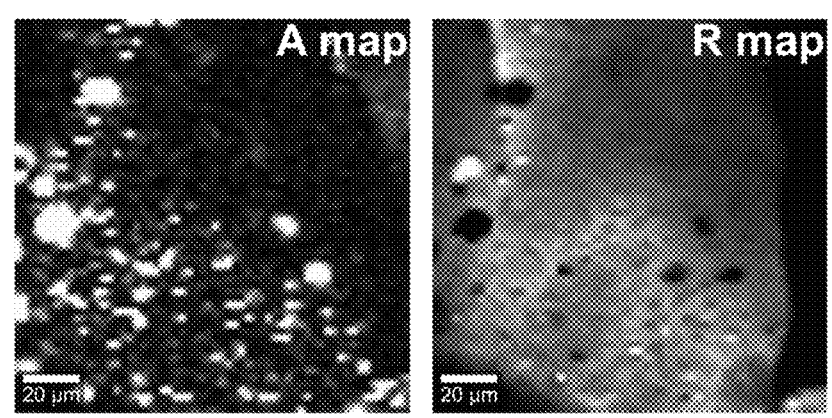
Figure 11c
Figure 11d

P-DOPED SURFACE COATINGS AND PROCESS OF PREPARATION THEREOF

CROSS-REFERENCE TO RELATED APPLICATIONS

This application is a National Stage entry under 35 U.S.C. § 371 of International Application No. PCT/EP2019/083778, filed Dec. 5, 2019, which claims the benefit of and priority from Taiwan Patent Application No. 108121577, filed Jun. 20, 2019, Oman Patent Application No. OM/P/2019/00192, filed May 7, 2019, Colombia Patent Application No. NC2019/0002089, filed Mar. 5, 2019, and Great Britain Patent Application No. 1820094.9, filed Dec. 10, 2018, said applications are incorporated herein by reference in their entirety.

FIELD

The present application relates to anti-microbial coatings for surfaces; and more particularly to coatings doped by phosphorus which are referred to as "P-doped coatings" and which are active in both the UV and visible light spectrum.

BACKGROUND OF THE INVENTION $TiO_2$ has been extensively used in different photocatalytic applications including antimicrobial coatings. The main photoactive polymorphs of $TiO_2$ are anatase and brookite, with anatase being the most efficient. The photocatalytic effect initiates by absorbing light with an energy equal to or greater than the bandgap of $TiO_2$. Consequently, the electrons in the valence are excited to the conduction band, while positive holes form in the valence band. These photoexcited electrons and photogenerated positive holes are responsible for photocatalytic reactions.

To make photocatalysts responsive to visible light, it is necessary to narrow the band gap energy between the valence band and the conduction band or to form other energy levels between them. Nevertheless, the bandgap of $TiO_2$ (anatase phase≈3.2 to 3.3 eV) lies in the UV region of the electromagnetic spectrum, limiting its photoactivation under visible light. This has become the driving force for developing various strategies in an effort to modify the bandgap of $TiO_2$.

Tuning the electrical properties of $TiO_2$ can be performed in different ways; and doping (including doping by metal or non-metal, or co-doping) is one of the effective approaches to fulfil this objective. Non-metal doping is one of the methods to shift the photoactivation of anatase $TiO_2$ into the visible range. This group of dopants has two sub-groups namely cationic and anionic, with anions narrowing the bandgap and cations injecting electrons into the conduction band and creating intermediate energy levels.

Phosphorus as a dopant allows the possibility of both cationic ($P^{5+}$) and anionic ($P^{3-}$) doping of anatase $TiO_2$. In the pentavalent state ($P^{5+}$), phosphorus can induce a blue-shift and an increase in the free charge carriers of phosphorus-doped $TiO_2$ films.

International patent application no. WO2015/091261 discloses a process for the preparation of a photocatalytically active antimicrobial surface coating. The process mixes a chelating agent with titanium alkoxide and fluoroacetic acid, and subsequently adds an aqueous solution to the mixture.

Fluoroacetic acid is a highly corrosive acid and therefore it is advantageous to replace it with a less corrosive, more user-friendly acid. The application presents the development of a P-doped titania antimicrobial coating solution which has several advantages over the existing technology.

The advantages of the present invention result from the elimination of TFA and the inclusion of a phosphoric acid or derivative thereof, which in turn leads to improved process-related aspects: decreasing production cost, increasing the efficiency of doping, or reducing the acidity due to phosphoric acid being less corrosive than TFA, and, due to the non-volatility of phosphoric acid, the possibility of its addition at a later stage in the synthesis, thus resulting in the composition and doping level being customisable from a standard stock sol. Surprisingly, in addition, the anatase phase is present at higher temperatures when using the novel technology than when using F-doping.

SUMMARY

Accordingly, the present invention provides a process for the preparation of an antimicrobial coating solution, the process comprising the steps of:
(i) Mixing a chelating agent with a titanium alkoxide and a phosphorylating agent; and
(ii) Adding an aqueous solution to the mixture formed from step (i).
The present invention also provides a process according to the above process, wherein the aqueous solution is added in step (i) and the phosphorylating agent is added in step (ii).
The present invention also provides a process according to the above process, wherein the aqueous solution and the phosphorylating agent are added in step (ii).
The present invention also provides a process for making an antimicrobial powder comprising the initial step of preparing a solution as described above, evaporating the solvents from the solution and then annealing the residue at a temperature between 300° C. and 1400° C.
The present invention also provides a method of preparing an antimicrobial coating composition comprising the step of mixing the antimicrobial powder described above with a coating solution as prepared by the above processes.
The present invention also provides an antimicrobial coating composition obtained by the above method, wherein the coating composition is UV and visible light activated.
The present invention also provides an antimicrobial coating composition obtained by the above method, wherein the coating composition exhibits antimicrobial activity under both UV and visible light and in reduced light. The present invention also provides an antimicrobial coating composition obtained by the above method, wherein the coating composition is stable at temperatures up to 1400° C.
The present invention also provides an antimicrobial coating composition comprising a hydrolysed phosphorus-sol.
The present invention also provides an antimicrobial coating composition comprising a transparent phosphorus-doped titania coating.
The present invention also provides an antimicrobial coating composition comprising phosphorus-doped titanyl acetate.
The present invention also provides a method for coating a substrate, the method comprising the steps of (i) Depositing an antimicrobial coating solution prepared according to the process described above or an antimicrobial coating composition as described above, on a substrate
(ii) Drying said coating; and
(iii) Exposing the coated substrate to a temperature above 300° C. for a period of time in the range of 20 minutes to 30 hours.

The present invention also provides a coated substrate comprising an antimicrobial coating prepared by the process as described above.

One of the main advantages of P-doped coating solutions lies in the final production cost which in turn affects the marketed price for customers.

The P precursor used during solution production is non-volatile and non-oxidising. This makes the handling, storage and application of the solution straightforward. Moreover, no additional extraction and filtering system is needed on the production line.

Phosphoric acid is stable, even under thermal exposure conditions.

The anatase phase is present in the system to a large extent even at temperatures as high as 1100° C. This increases the product's potential applications, with many manufacturers requiring firing conditions at this temperature and above.

A first embodiment of the application provides a process for the preparation of an antimicrobial coating solution using orthophosphoric acid.

In one aspect, the present teaching provides a process for the preparation of an antimicrobial coating solution, the process comprising the steps of:
(i) mixing a chelating agent with titanium alkoxide and orthophosphoric acid; and
(ii) adding an aqueous solution to the mixture from step (i).

It is to be understood that in the preferred embodiment, the aqueous solution comprises solely water as the solvent. However, in an alternative embodiment, the aqueous solution can also comprise organic solvents such as alcohols including, but not limited to, ethanol, methanol or isopropanol, in an amount up to 80 water:20 organic solvent. However, this inclusion of an organic solvent would increase the 'carbon foot print' and the cost would be higher than in the embodiments in which the aqueous solution relies entirely on water as the solvent.

Accordingly, the present invention provides a process comprising an anionic dopant source that provides several simultaneous advantages over known formulations.

Firstly, by using a non-volatile dopant source, phosphoric acid, in place of trifluoroacetic acid, the doping efficiency is much improved, as practically none of the dopant source is lost during the coating process and it is instead incorporated into the titanium dioxide matrix.

It has surprisingly been found by the inventors that the introduction of phosphorus for fluorine as a dopant increases the anatase to rutile transformation by between 50° C. and 100° C., while still maintaining the reduction in bandgap energy that brings the longest effective light wavelength for photocatalysis into the violet part of the visible spectrum. Equally, there was an increase in pH from 1.1 to over 3.0 which makes the formulation less acidic.

The level of phosphorus doping provided by the present invention defines the advantageous technical effect that the band gap energy is shifted into the visible part of the spectrum, the anatase to rutile transformation temperature is increased and the formation of titanium phosphates is avoided and the doping method of the present invention has the surprising technical advantage of promoting uniform doping in a stable nanoparticulate sol, suitable for preparing robust, transparent coatings.

An advantage of the process according to the present teaching is that it allows for a thin homogeneous coating to be applied to a substrate (in this context, the term "thin" means approx 20 nm to 200 nm thickness for a single or multiple layer(s) and still provide for effective antimicrobial action, the end product being transparent to the user.

The addition of an aqueous solution is counter intuitive because normally the addition of water would cause the titanium dioxide to precipitate out. However, it has been found that by using a high ratio of the aqueous solution to the other components that precipitation is avoided. The term, "high ratio" means above 50 moles times (e.g. for every 1 mole of titania precursor 50 or more mole times aqueous solution is required). Ideally, between 90 to 200 mole times is used to ensure full dissolution). (Any solvent ratio lower than 50 mole times would not achieve the advantageous results of the present invention).

In this specification, weight % (wt %) is to be construed as meaning weight % relative to the weight of the total composition.

The chelating agent may be a carboxylic acid.

The carboxylic acid may be selected from the group consisting of formic acid, propionic acid, butanoic acid and acetic acid.

Preferably, the carboxylic acid is acetic acid. The preferred form of acetic acid is glacial acetic acid. Where the acetic acid is selected as the chelating agent, the preferred form is glacial acetic acid to prevent reaction between water and the titanium alkoxide prior to the step of adding the aqueous solution. The amount of glacial acetic acid used may be in the range 1 to 40 wt %; preferably in the range 1 to 20%; more preferably in the range 12 to 18 wt % and most preferably, in the range 2 to 10 wt %.

The titanium alkoxide may be selected from the group consisting of titanium isopropoxide, titanium ethoxide, titanium methoxide and titanium butoxide. The preferred titanium alkoxide is titanium isopropoxide as its performance has been clearly demonstrated to provide an effective coating solution.

The amount of titanium isopropoxide used may be in the range 4 to 15 wt %, preferably 6 to 12 wt %.

The phosphoric acid is preferably orthophosphoric acid. Other phosphorylating agents may be selected from the group consisting of phosphorus pentoxide, ammonium dihydrogen phosphate and diammonium hydrogen phosphate.

The amount of orthophosphoric acid used may be in the range 0.0001 to 1% %, preferably in the range 0.0002 to 0.005%.

The amount of water used may be in the range 30 to 99.5 wt %, preferably 40 to 99 wt %; and most preferably, 50 to 95 wt %. (Wt % water compared to the wt of the total composition).

The process may be carried out at a temperature between 10 and 65° C.

In one aspect, the present teaching provides a process for making an antimicrobial powder, the process comprising the initial step of preparing a solution in accordance with the process described herein and then evaporating the solvents and then annealing the residue at a temperature between 300° C. and 1400° C.

In a further aspect, a method of preparing an antimicrobial coating is provided, the method comprising the step of mixing an antimicrobial powder as prepared by the process described herein, with a coating composition.

Preferably, the coating composition comprises an aqueous solution and the method comprises the step of phosphorylating the solution with a phosphorylating agent. The phosphorylating agent may be selected from a range including orthophosphoric acid, phosphorus pentoxide, ammonium dihydrogen phosphate and diammonium hydrogen phosphate including said derivatives.

A visible light activated antimicrobial coating composition is obtained by the method described herein. The coating described herein can be used under indoor lighting conditions. The antimicrobial coating composition exhibits antimicrobial activity under visible light and in reduced light.

The antimicrobial compositions described herein are stable at high temperatures. Suitably, the antimicrobial coatings composition described herein is stable at temperatures up to at 1400° C.

A method for coating a substrate is provided, the method comprising the steps of
(i) depositing an antimicrobial coating solution prepared according to the process described herein or an antimicrobial coating composition described herein, on a substrate;
(ii) drying said coating; and
exposing the coated substrate to a temperature above 300° C. for a period of time in the range 20 minutes to 30 hours.

The coated substrate may be exposed to a temperature in the range 300° C. to 1400° C. Where the substrate is glass or comparable composite material, the temperature is preferably in the range of 350° C. to 700° C., most preferably 450° C. to 590° C.

In the case where the substrate is a ceramic material, the third step (iii) may be a firing process. The temperature may be between 350-800° C. for a second firing step or the temperature may be between 500-1400° C. for a firing process having a single firing.

Suitably, the composition according to the present teaching can be applied in liquid form to a substrate to provide a coating.

The liquid coating may be deposited by any suitable method. Suitable methods may include but are not limited to spraying, dipping, roller, brush, electrostatic and spin-coating.

Suitably, the present application provides an antimicrobial coating composition comprising phosphorus-doped titanyl acetate. Advantageously, this may be in the form of a gel or a compressed tablet which may be packaged and shipped to locations where the coating composition is be applied. The advantage being that the coating composition may be manufactured and packaged for shipping in relatively small amounts reducing packaging and shipping costs. A further advantage is that the shelf life is effectively lengthened by at least several months. At the location of the coating process, water may be added as required. Once the water is added the phosphorus-doped titanyl acetate is hydrolysed.

In a further aspect, the present teaching provides a coated substrate comprising an antimicrobial coating prepared by the process described herein or an antimicrobial coating composition described herein.

The substrate may be selected from the group consisting of glass and related composite materials, ceramics, plastic, cement and clay. Where the substrate is glass, the glass may be, for example, a chemically strengthened glass or tempered glass. In specific applications, the substrate may be a clay brick, ceramic tile or element of sanitary ware.

BRIEF DESCRIPTION OF THE DRAWINGS

The present application will now be described with reference to the accompanying drawings in which:

FIGS. 10a and 10b are an Optical micrograph and Raman imaging maps of anatase and rutile phases from the scanned red square area of KCS 111 @ 1000° C. respectively;
FIGS. 11a, 11b, 11c and 11d are total average spectrum and anatase and rutile maps of KCS 111 @ 1100° C.

DETAILED DESCRIPTION OF THE DRAWINGS

Figure 1:
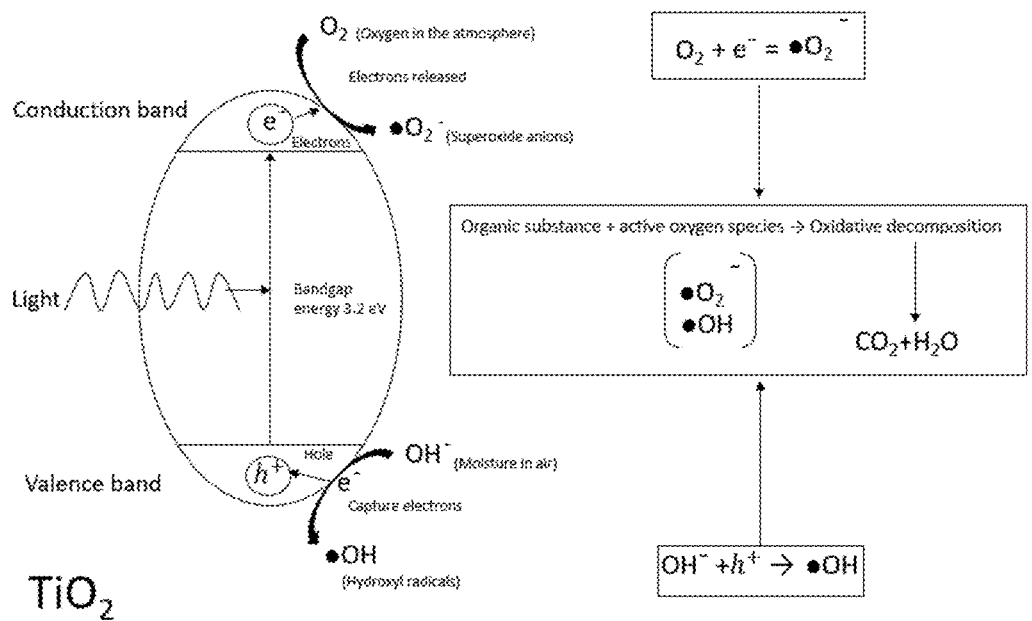
FIG. 1 is a schematic of photocatalytic activity of a $TiO_2$ surface.

The present application provides an industrially viable water-based environmentally benign, processing technology for the production of antimicrobial coating solutions.

The P-doped anti-microbial coating solution described herein is eco-friendly which is highly desirable. The solution used is water based and the phosphorus doping agent is more environmentally favourable in comparison to its corrosive trifluoroacetic acid counterpart.

Orthophosphoric acid was chosen as the preferred phosphorus source as it is readily available in high purity, is non-toxic, non-volatile, relatively inexpensive and as an acid, does not introduce any cations not already present in the sol. in the phosphorus source, such as orthophosphoric acid, is suitable for use in the process and can be used in relatively low concentrations (in the range of 0.0001 to 1 wt %), since losses through evaporation prior to firing will be minimal.

The present invention will now be described with reference to the following examples which are provided, by way of example only.

TABLE 1

P-Doping amounts
P-Doping amounts

| Batch | Volume OPA added (ml) | (x doping) | OPA % v/v |
|---|---|---|---|
| KCS110 | 0.057 | 1 | 0.0004 |
| KCS111 | 0.14 | 2.46 | 0.0009 |
| KCS112 | 0.5 | 8.77 | 0.0033 |
| KCS117 | 0.14 | 2.46 | 0.0009 |
| KCS118 | 0.14 | 2.46 | 0.0009 |

The formulation may optionally include a dispersing agent, to increase the stability of the titanium dioxide dispersion, over and above that achieved by the ionic double layer repulsion resulting from adsorption of the dissociated acids. Such a dispersing agent should ideally be added to the formulation after the hydrolysis is complete. Suitable dispersing agents include organic compounds such as alkanes and alkene oligomers modified with multiple carboxylic acid groups, amine groups or alcohols on side chains. Examples of suitable dispersing agents include Disperbyk 180, Disperbyk 2060, Disperbyk 2061, Disperbyk 2062, Disperbyk 2080, Disperbyk 2081 and Disperbyk 2205. The five samples, logged as KCS110, KCS111, KCS112, KCS 117 and KCS 118 were prepared as follows.

Example 1

Examples 1-3 describe an embodiment of the invention wherein the order of addition is as follows:
a) tetraisopropoxide
b) glacial acetic acid
c) orthophosphoric acid (aqueous) and finally
d) de-ionised water.
  In an alternative embodiment a dispersing agent may be added following the addition of de-ionised water.
KCS110:
1. 10 mL titanium tetraisopropoxide (TTIP) was placed in a polypropylene beaker.
2. 19.2 mL glacial acetic acid was added while stirring.
3. 0.057 mL 86% orthophosphoric acid (aqueous) was added while stirring.
4. 120 mL deionised water was added while stirring and the mixture stirred for a further 40 minutes, to form a colourless, slightly hazy sol, which was then bottled.

Example 2

KCS111:
1. 10 mL TTIP was placed in a polypropylene beaker.
2. 19.2 mL glacial acetic acid was added while stirring.
3. 0.14 mL 86% orthophosphoric acid (aqueous) was added while stirring. A small quantity of white precipitate began to form.
4. 120 mL deionised water was added while stirring and the mixture stirred for a further 40 minutes. A sol with a translucent milky white appearance was formed and the precipitate previously formed re-dispersed, which was then bottled.

Example 3

KCS112:
1. 10 mL TTIP was placed in a polypropylene beaker.
2. 19.2 mL glacial acetic acid was added while stirring.
3. 0.5 mL 86% orthophosphoric acid (aqueous) was added while stirring. A larger quantity of white precipitate began to form than in the case of KCS111.
4. 120 mL deionised water was added while stirring and the mixture stirred for a further 40 minutes. A sol with a translucent milky white appearance was formed, that was denser in colour than KCS111, which was then bottled.

Example 4

Example 4 describes an alternative embodiment, wherein the order of addition of the reagents is as follows:
a) TTIP
b) Glacial acetic acid
c) De-ionised water
d) Orthophosphoric acid (aqueous)
  A dispersing agent may be added following the addition of orthophosphoric acid.
KCS117:
Orthophosphoric acid can be added after the addition of the deionised water to the glacial acetic acid/TTIP mixture.
1. 10 mL TTIP was placed in a polypropylene beaker.
2. 19.2 mL glacial acetic acid was added while stirring.
3. 120 mL deionised water was added while stirring and the mixture stirred for 20 minutes. A sol with a translucent milky white appearance was formed.
4. 0.14 mL 86% orthophosphoric acid (aqueous) was added while stirring. A small quantity of white precipitate began to form. The sol was stirred for a further 40 minutes and this precipitate re-dispersed.

Example 5

Example 5 describes an alternative embodiment, wherein the order of addition of the reagents is as follows:
a) TTIP
b) Glacial acetic acid
c) Orthophosphoric acid (aqueous) dissolved in de-ionised water
A dispersing agent may be added following the addition of orthophosphoric acid.
KCS118:
Orthophosphoric acid can be added at the same time as the addition of the deionised water to the glacial acetic acid/TTIP mixture.

1. 10 mL TTIP was placed in a polypropylene beaker.
2. 19.2 mL glacial acetic acid was added while stirring and the mixture stirred for 20 minutes.
3. 0.14 mL 86% orthophosphoric acid (aqueous) was dissolved in 120 mL deionised water. This solution was added to the mixture of TTIP and glacial acetic acid while stirring and the mixture stirred for 40 minutes. A sol with a translucent milky white appearance was formed.

Antimicrobial Testing Results

Antimicrobial testing was carried out to determine the antibacterial activity of a photocatalytic material applied to ceramic tiles against *Staphylococcus aureus* after 6 hours exposure to light as per ISO 27447:2009.

18 ceramic tiles coated with KCS116 and 24 uncoated ceramic tiles were submitted to an independent third party, namely, Airmid Healthgroup Ltd., for testing by the Applicant. Six coated and nine uncoated control ceramic tiles were randomly selected for testing.

The number of viable bacteria recovered from the tiles at t=0 and after 6 hours exposure to UV or dark conditions are expressed as colony forming units per ml (cfu/ml). The photocatalytic antibacterial activity value after irradiation (RL) and the photocatalytic antibacterial activity including any effect in the dark (ΔR) are calculated from the logarithmic values for viable bacteria (cfu/ml) according to the formulae in ISO 27447: 2009. These results are presented in Table 2 below.

TABLE 2

Antimicrobial testing of coated and uncoated samples
Summary of Results for *Staphylococcus aureus*

| Sample | Sample Exposure | Contact Time 0 Hrs | Contact Time 6 Hrs | Log Values $Log_{10}$ |
|---|---|---|---|---|
| KCS116 coated | UV 0.25 mW/cm² | 3.88E+05 | 3.33E+01 | 0.47 |
| KCS116 coated | Dark | 3.88E+05 | 1.69E+05 | 5.12 |
| Uncoated Control | UV 0.25 mW/cm² | 3.88E+05 | 9.67E+04 | 4.93 |
| Uncoated Control | Dark | 3.88E+05 | 1.04E+05 | 5.01 |

It can be seen from the results outlined in Table 2 that there is a significant reduction in the number of colony forming units following UV exposure observed regarding the formulation coated sample in comparison to the control.

The log values from the Table 2 were used to calculate RL and ΔR, where the Photocatalytic antibacterial activity RL=3.46 and the Photocatalytic antibacterial activity including any effect in the dark ΔR=3.67.

Sample Preparation

The crystal structure, phase composition, and bandgap of P-doped solution were determined by Raman spectroscopy, X-ray diffraction, and UV-Vis spectroscopy after heating to 700° C., 900° C., 950° C., 1000° C. and 1100° C.

Powders were prepared from each sol by heating samples of approximately 20 mL to 200° C. on a hotplate. The dried residue was then heated at a rate of 10° C. per minute to the target temperature, held for 1 hour and then allowed to cool naturally to room temperature.

Antibacterial Activity of Photocatalytic Materials According to ISO 27447:2009

Purpose

The purpose this test was to determine the antibacterial activity of a photocatalytic material applied to ceramic tiles against *Staphylococcus aureus* after 6 hrs exposure to UV light as per ISO 27447:2009.

Procedure

The experimental procedure was performed according to ISO 27447: 2009.

Details of the test-setup are summarised in the following table.

| Test set-up details | |
|---|---|
| ISO27447 Method used: | Film Adhesion Method |
| Bacteria | *Staphylococcus aureus* (ATCC ® 6538P) |
| Light Source | UV 15 W Fluorescent Blacklight Lamp (F15T8/BL) |
| UV intensity | 0.25 mW/cm² |
| UV Contact Time | 6 hrs |

Calculations

Number of viable bacteria recovered from the tiles at t=0 and after 6 hours exposure to UV or dark are expressed as colony forming units per ml (cfu/ml). The photocatalytic antibacterial activity value after irradiation ($R_L$) and the photocatalytic antibacterial activity including any effect in the dark (ΔR) are calculated from the logarithmic values for viable bacteria (cfu/ml) according to the formulae in ISO 27447: 2009. These results are presented in Table 4.1.

Satisfaction of Criteria for a Valid Test

Test results obtained were assessed for validity according to the criteria specified in ISO 27447:2009. The criteria are summarised in Table 4.2 below. All four criteria shown in Table 4.2 must be met in order for the test to be valid. If one or more of these criteria are not met, the test is deemed invalid and must be repeated.

Results

Log values for viable bacterial counts (cfu/ml) recovered from the coated and uncoated ceramic tiles after 6 hrs contact time with UV or in the dark were are shown in Table 4.1.

TABLE 4.1

Summary of Results for *Staphylococcus aureus*

| Sample | Sample Exposure | Contact Time 0 Hrs | Contact Time 6 Hrs | Log Values $Log_{10}$ |
|---|---|---|---|---|
| KCS116 coated | UV 0.25 mW/cm² | 3.88E+05 | 3.33E+01 | 0.47 |

TABLE 4.1-continued

Summary of Results for *Staphylococcus aureus*

| Sample | Sample Exposure | Contact Time 0 Hrs | Contact Time 6 Hrs | Log Values $Log_{10}$ |
|---|---|---|---|---|
| KCS116 coated | Dark | 3.88E+05 | 1.69E+05 | 5.12 |
| Uncoated Control | UV 0.25 mW/cm² | 3.88E+05 | 9.67E+04 | 4.93 |
| Uncoated Control | Dark | 3.88E+05 | 1.04E+05 | 5.01 |

Photocatalytic Antibacterial Activity Results—$R_L$ and $\Delta R$

The log values from the Table 4.1 were used to calculate $R_L$ and $\Delta R$

Summary of Results

Photocatalytic Antibacterial Activity $R_L$=3.46

Photocatalytic Antibacterial Activity Including any Effect in the Dark $\Delta R$=3.67

Validity of Results

TABLE 4.2

Summary of Validity Criteria for ISO 27447 test

| Criterion | Criterion | Result | Criteria Met (✓/x) |
|---|---|---|---|
| Log value of No. bacteria at 0 hrs after inoculation | (Lmax − Lmin)/ (Lmean) < 0.2 | 5.60 − 5.58/ 5.59 = 0.004 | ✓ |
| No. bacteria at 0 hrs after inoculation (cfu/ml) | 1 × 10⁵ to 4 × 10⁵ | 3.8 × 10⁵ to 4.0 × 10⁵ | ✓ |
| No. bacteria after 6 hrs UV exposure for uncoated tiles (cfu/ml) | >1 × 10³ | 4.0 × 10⁴ to 3.95 × 10⁴ | ✓ |
| No. bacteria after 6 hrs in dark for uncoated tiles (cfu/ml) | >1 × 10³ | 7.5 × 10⁴ to 1.2 × 10⁵ | ✓ |

Analysis and Results

Raman Spectroscopy

As stated in the background, in order for a $TiO_2$ surface to be photocatalytic, it must be in the Anatase or Brookite phase (more commonly Anatase). Therefore, the factor which limits the temperature range for firing of a $TiO_2$ solution, is the temperature at which it will still have enough Anatase present to be a functional photocatalyst. This transition from Anatase to Rutile is also time dependent, however, if time is kept constant across all quality checks, then a comparison can be built up between the abilities of the F-doped and P-doped solutions to maintain Anatase at high temperatures.

Samples of the different levels of P-doping were converted to powder form by calcination at various temperatures. These samples were then examined by Raman Spectroscopy to determine the presence of Anatase, Rutile and Brookite in them.

The Raman measurements were carried out using a laser with excitation wavelength of 532 nm (700-800 nm sampling depth). The spectra were recorded in two modes, namely line scan and image scan. In the line scan mode, 30 points across a line with integration time of 15 s were measured across several areas of the powdered specimen. For Raman imaging, 3600 spectra were averaged in the chosen areas across the sample. This comprehensive Raman sampling ensured the obtained spectra are representative of the powder sample characteristics.

Summary of Raman Results

For reference, the Raman peak position of three natural $TiO_2$ polymorphs has been tabulated and shown in Table 3. It is noted that in each crystal phase, there is a strong Raman peak which is indicative of the presence of that $TiO_2$ crystal phase in the sample. If that peak is observed, then other peaks can be assigned accordingly; otherwise, assigning unknown peaks that appear at the wavenumbers close to the values shown in Table 3 to a particular titania crystal phase is incorrect.

TABLE 3

$TiO_2$ natural polymorph Raman peak positions.

| Anatase | Rutile | Brookite |
|---|---|---|
| | | 127, strong, $A_{1g}$ |
| | | 133, weak, $B_{1g}$ |
| 144, very strong, $E_g$ | 143, weak, $B_{1g}$ | |
| | | 153, very strong, $A_{1g}$ |
| | | 159, shoulder, $B_{1g}$ |
| | | 172, shoulder, $B_{3g}$ |
| 197, weak, $E_g$ | | 194, weak, $A_{1g}$ |
| | | 215, weak, $B_{1g}$ |
| | 235, broad medium, combination band | |
| | | 247, medium, $A_{1g}$ |
| | | 254, weak, $B_{2g}$ |
| | 273, shoulder | 287, weak, $B_{3g}$ |
| 320, very weak, combination band | 320, weak, 2$^{nd}$ order band | 320, weak, $B_{1g}$ |
| | | 329, weak, $B_{2g}$ |
| | 357, weak, 2$^{nd}$ order band | |
| | | 366, weak, $B_{2g}$ |
| 399, medium, $B_{1g}$ | | 395, shoulder, $B_{2g}$ |
| | | 412, weak, $A_{1g}$ |
| | | 415, weak, $B_{1g}$ |
| | 447, strong, $E_g$ | 452, weak, $B_{3g}$ |
| | | 463, weak, $B_{2g}$ |
| | | 476, weak, $B_{3g}$ |
| | | 497, weak, $A_{1g}$ |
| | | 502, weak, $B_{1g}$ |
| 516, medium, $A_{1g}$ & $B_{1g}$ | | |
| | 612, strong, $A_{1g}$ | 545, weak, $B_{3g}$ |
| | | 584, weak, $B_{2g}$ |
| | | 618, weak, $B_{3g}$ |
| 639, medium, $E_g$ | | 640, strong, $A_{1g}$ |
| 695, very weak, combination band | | |
| 796, weak, $B_{1g}$ overtone | | |
| | | 826, weak, $B_{2g}$ |

Figure 2:
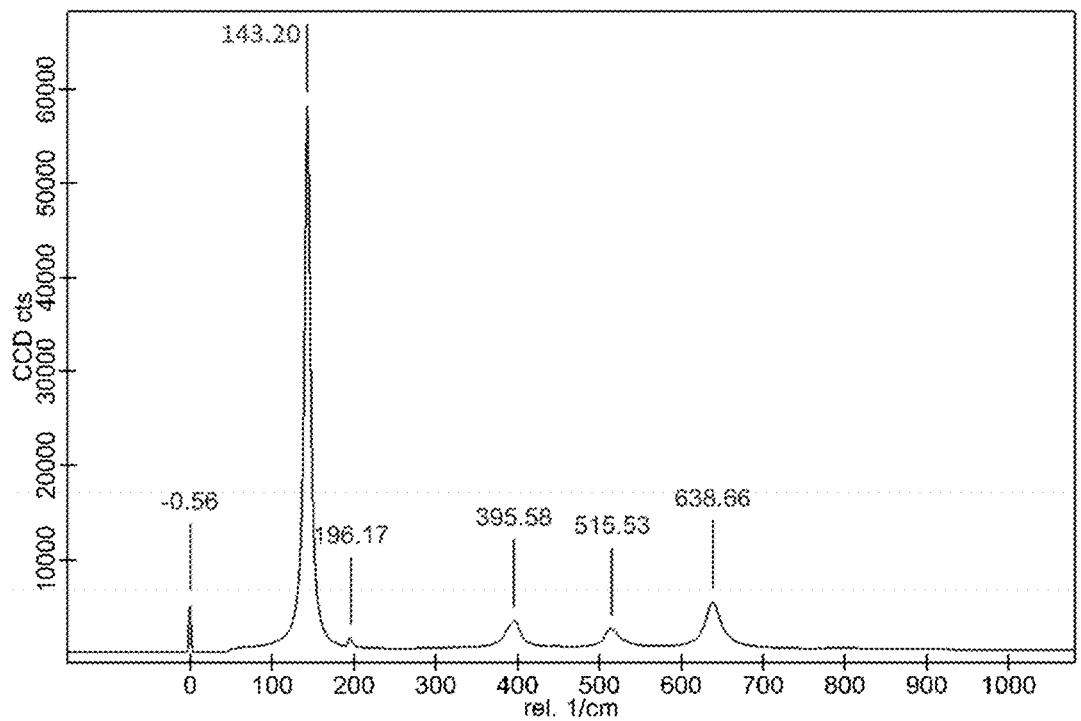
FIG. 2 is a Raman spectrum of KCS 110 @ 900° C.

The Raman spectrum of FIG. 2 was recorded from a sample fired at 900° C. The most prominent Raman band is the peak at 143.2 cm⁻¹ that is confidently assigned to the Anatase $E_g$ Raman mode. The other Raman peak observed in the spectrum are also assigned to various other Raman modes of Anatase which appear with less intensity.

Figure 3:
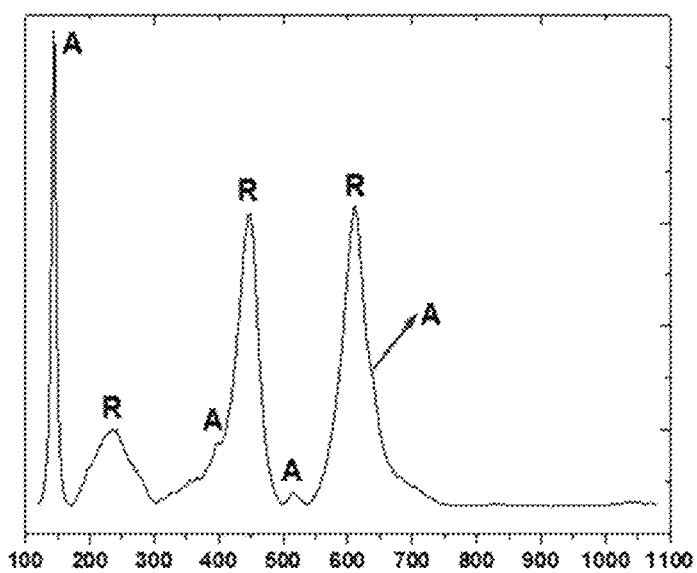
FIG. 3 is a Raman spectrum of KCS 110 @ 950° C.

The spectrum of FIG. 3 was recorded from a sample fired at 950° C. but cooled in a furnace with faster cooling rate in comparison to the previous specimen. The A refers to Anatase and R denoted Rutile phase in the spectrum. One can notice that faster cooling rate results in higher fraction of Rutile which could be due to the fact that Anatase is an elongated structure, so the atoms need more time for diffusion along the c axis of the crystal.

Figure 4:
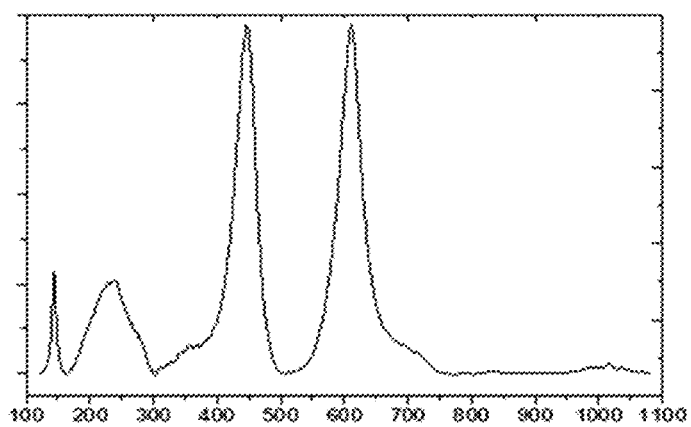
FIG. 4 is a Raman line-scan spectrum of KCS 110 @1000° C.
Figures 5A, 5B, 5C:
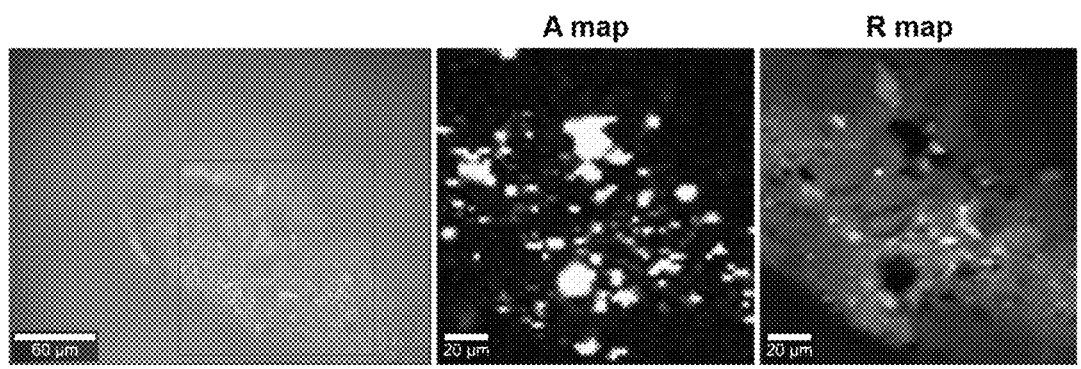
FIGS. 5a, 5b and 5c are images from Raman imaging of KCS 110 @ 1000° C.

FIG. 4 shows a line scan spectrum averaged over 30 points of data acquisition, showing similar bands to the previous spectrum. One can note that even at 1000° C. there is still Anatase detectable in the specimen. To further analyse the distribution of anatase and its fraction, Raman imaging was carried out whose results are shown in FIG. 5. The results confirm that Anatase is present in satisfactory quantity over the surface.

Figure 6:
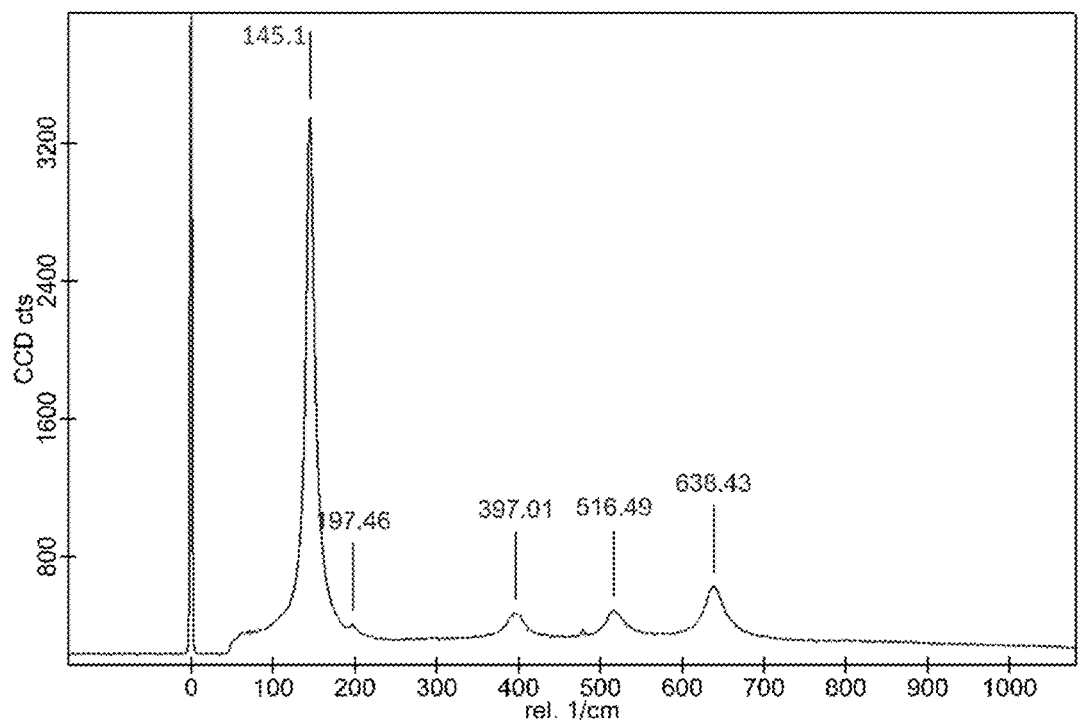
FIG. 6 is a Raman spectrum of KCS 111 @ 700° C.

FIG. 6 shows the line scan averaged spectrum of specimen fired at 700° C. As expected, the only detectable Raman peaks are related to Anatase phase, comprising %100 of the specimen.

Figure 7:
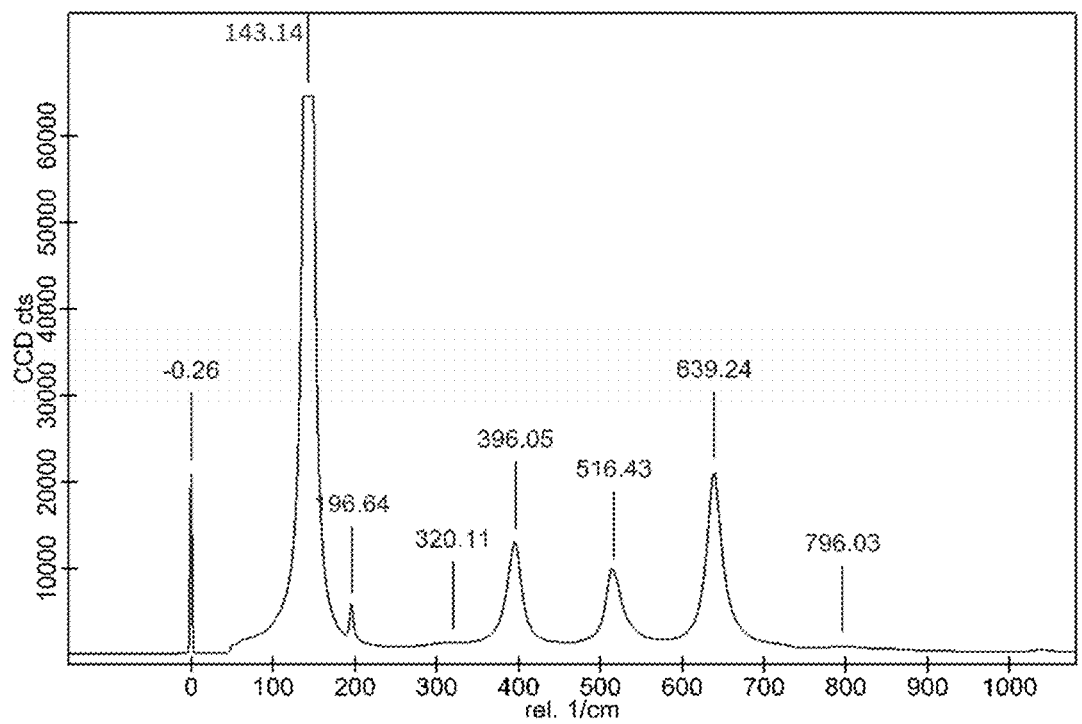
FIG. 7 is a Raman spectrum of KCS 111 @ 900° C.

FIG. 7 displays the averaged Raman line-scan spectrum of 900° C., clearly showing presence of Anatase phase in the specimen. The very weak almost negligible peaks at ~796 $cm^{-1}$ and $cm^{-1}$>1000 are attributed to titanium phosphate phases.

Figure 8:
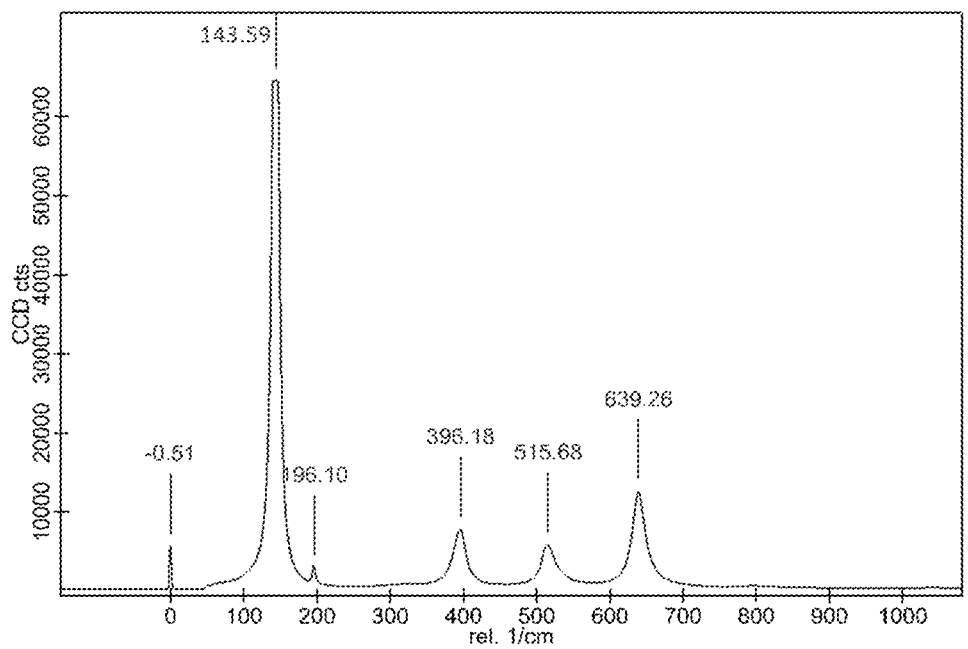
FIG. 8 is a Raman spectrum of KCS 111 @ 950° C.

FIG. 8 shows the Raman spectrum of 950° C. sample averaged over 30 points in a line-scan. The spectrum only consists of Anatase peaks, implying one-phase nature of this sample.

Figure 9:
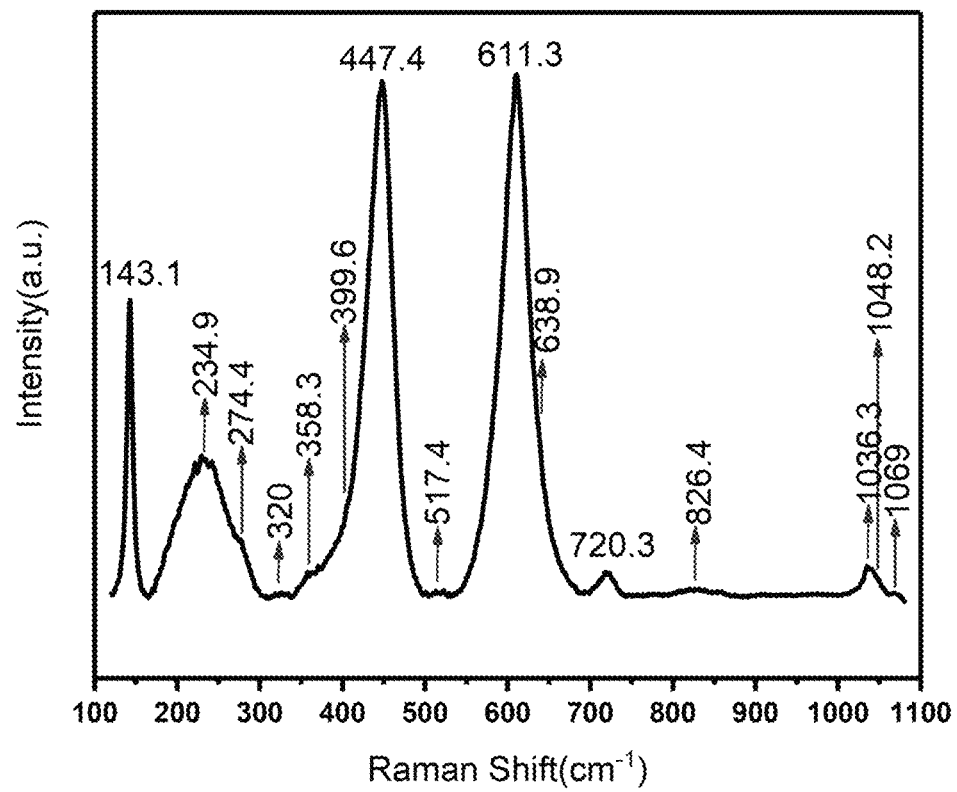
FIG. 9 is a Raman spectrum via line-scan mode from KCS111 @ 1000° C.

FIG. 9 shows the average spectrum of 1000° C. specimen, showing a mixed-phase nature. The medium and strong peaks are assigned as (left to right): 143.1 to Anatase, 234.9 to Rutile, 447.7 to Rutile, 611.3 to Rutile. The peaks at 720 and ~1036 are attributed to titanium phosphate phases.

FIG. 10 shows the optical microscope image (left) and the scanned area (red square) and the corresponding Raman imaging maps of Anatase and Rutile phases.

FIG. 11 shows the optical microscope image, total average spectrum, and corresponding Anatase and Rutile maps of the red square marked in the green image. These results suggest that even at a temperature as high as 1100° C., there is still noticeable amount of Anatase present in the specimen.

Figure 12:
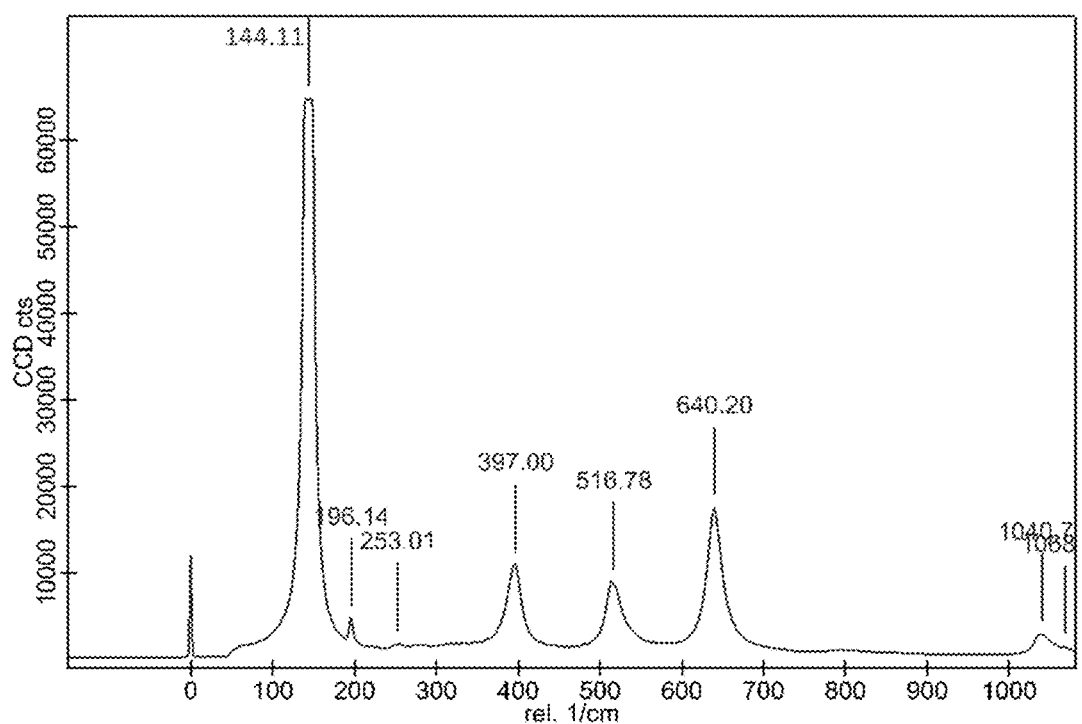
FIG. 12 is a Raman spectrum of KCS 112 @ 900° C.
Figure 13:
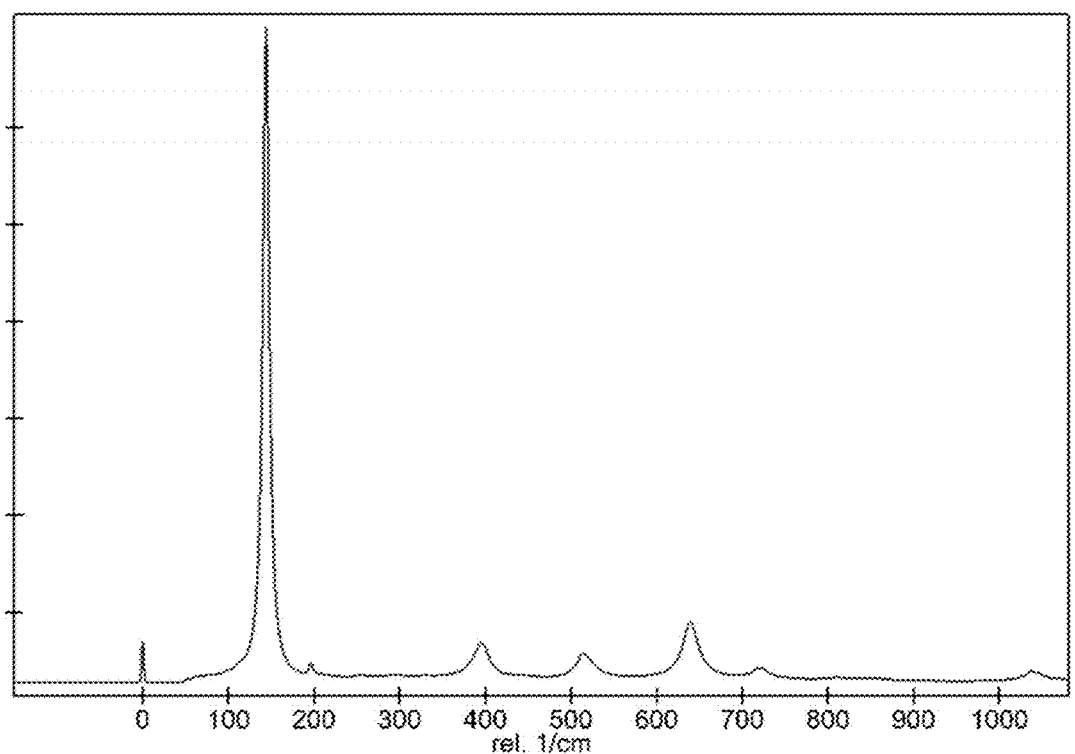
FIG. 13 is a Raman spectrum of KCS 112 @ 950° C.
Figure 14A:
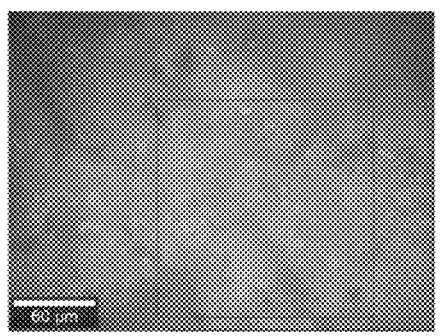
FIGS. 14a, 14b, 14c, 14d and 14e are an optical micrograph, total average spectrum, and anatase, rutile, TPP phase Raman maps from KCS112 @ 1000° C. respectively.
Figure 14B:
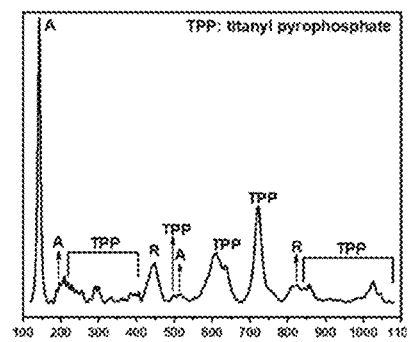
Figure 14C:
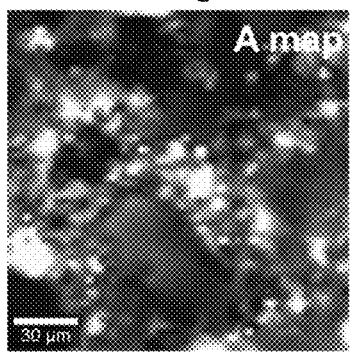
Figure 14D:
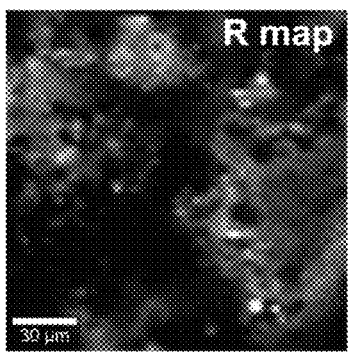
Figure 14E:
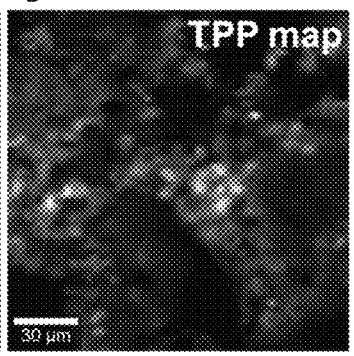
Figure 15A:
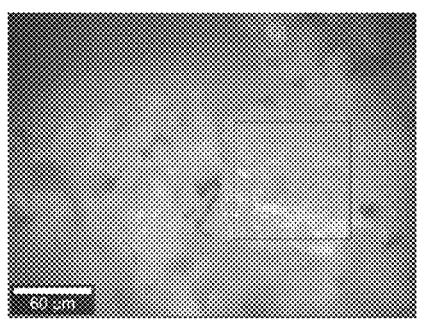
FIGS. 15a, 15b, 15c, 15d and 15e are an optical micrograph, total average spectrum, and various phases Raman maps of KCS 112 @1100° C. respectively.
Figure 15B:
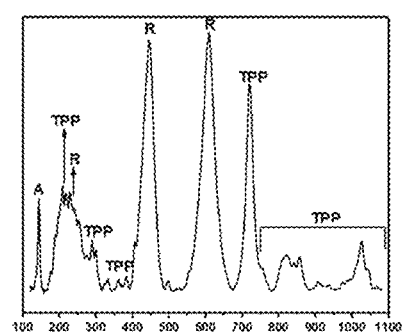
Figure 15C:
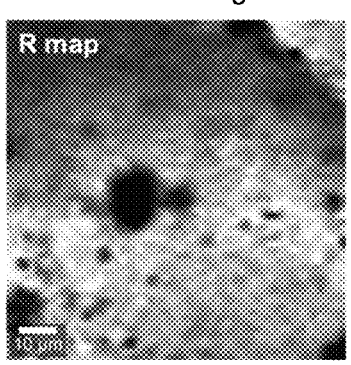
Figure 15D:
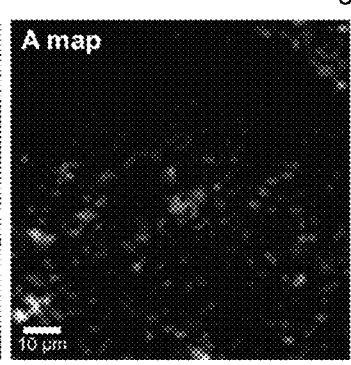
Figure 15E:
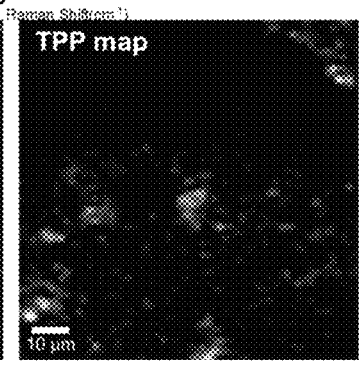

FIG. 12 displays the Raman spectrum of sample averaged over 30 points line-scan acquisitions. The spectrum consists of strong representative Anatase peaks and some weak peaks at wavenumbers >1000 $cm^{-1}$ which are assigned to Ti phosphate phases. The same behaviour was observed in the case of specimen fired at 950° C. (see FIG. 13).

FIG. 14 shows the Raman imaging results from the 1000° C. sample. The main point to note is the strong Anatase signal and the titanyl pyrophosphate (TPP) phase. This implies that a higher P content in the sol results in stabilisation of Anatase, while the fraction of TPP phase also increases.

FIG. 15 shows the Raman imaging results of sample fired at 1100° C. While Rutile makes up the matrix phase of specimen, it is interesting to see that Anatase is still present at such a high temperature. One difference to note is the intensity of TPP phase that has increased in this sample, possibly due to the higher energy input in the system to overcome the energy barrier needed to form TPP phases. Since TPP can act as photocatalyst itself, the overall photocatalytic performance of the system is expected to improve.

X-Ray Diffractometry (XRD) Results

KCS110

Figure 16:
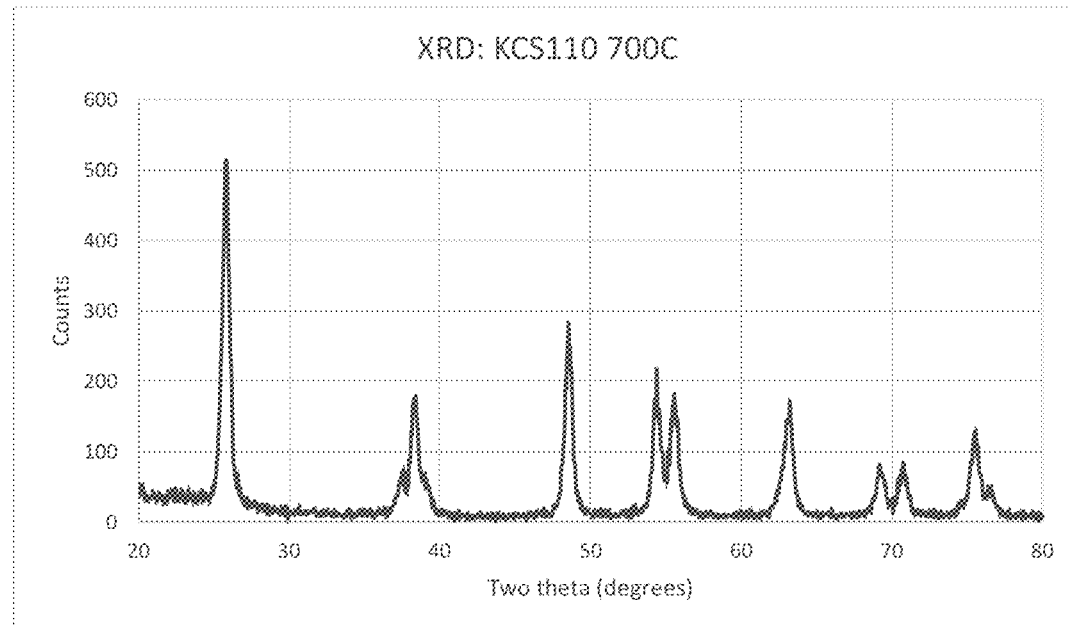
FIG. 16 is an XRD spectrum of KCS 110 @700° C.
Figure 17:
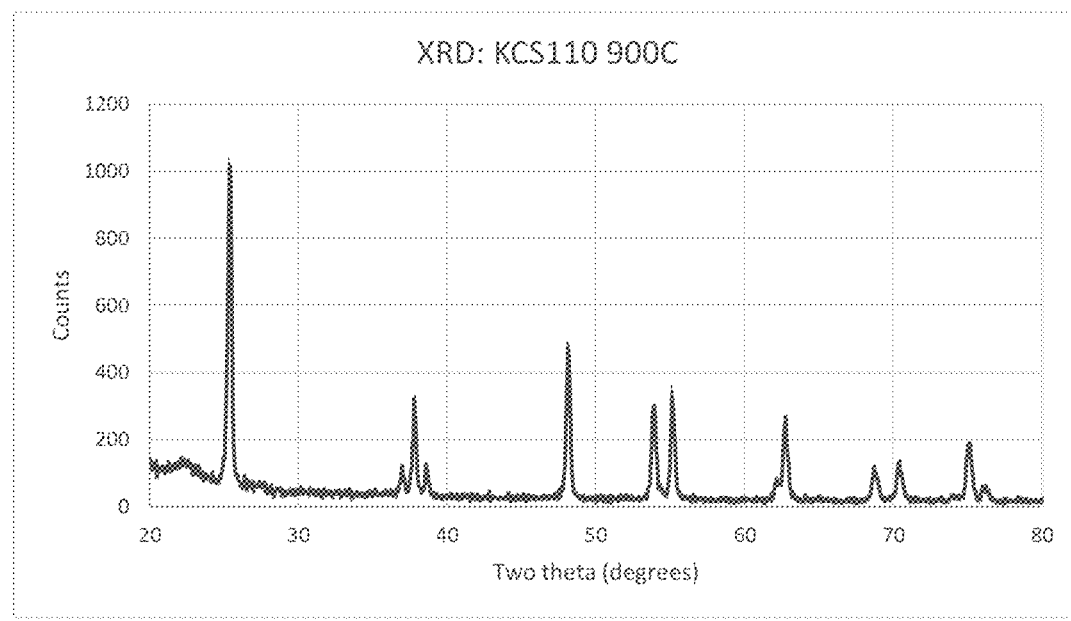
FIG. 17 is an XRD spectrum of KCS 100 @ 900° C.
Figure 18:
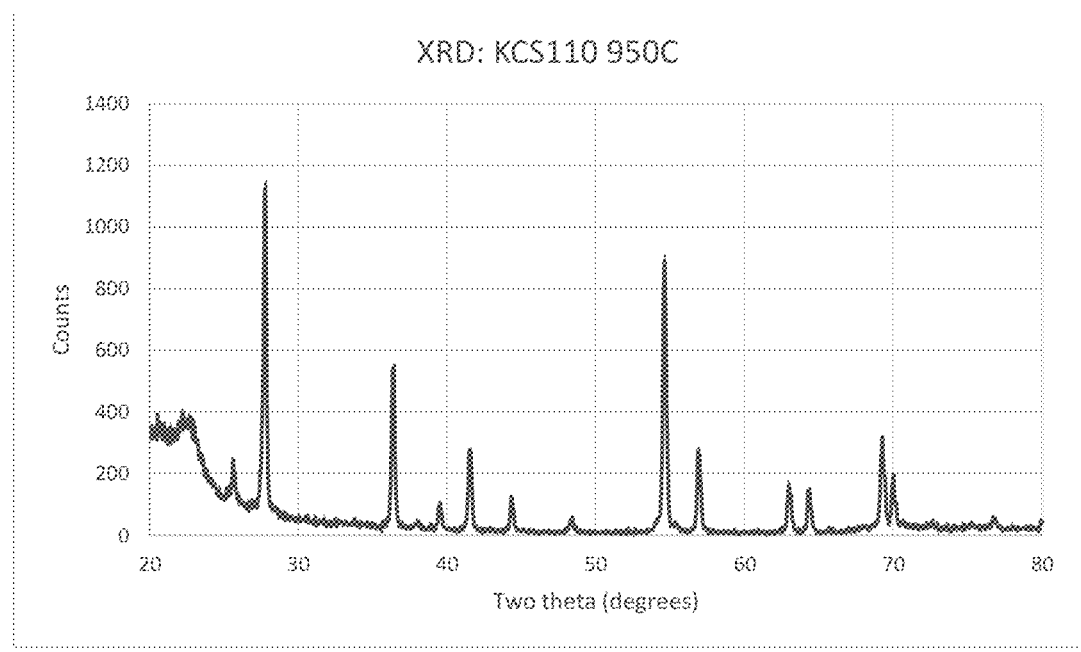
FIG. 18 is an XRD spectrum of KCS 110 @ 950° C.
Figure 19:
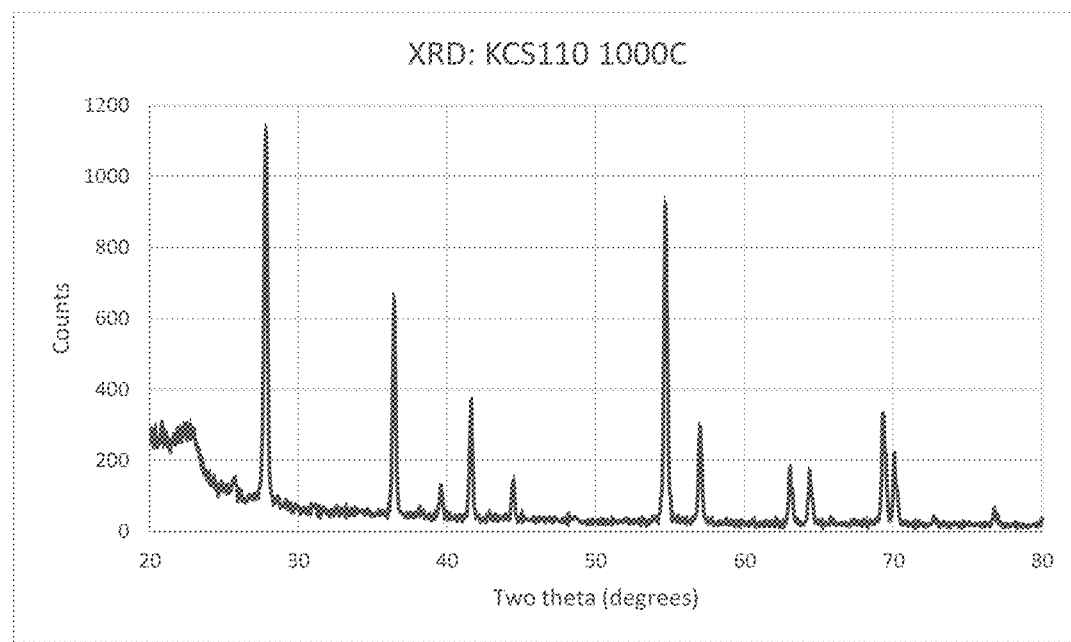
FIG. 19 is an XRD spectrum of KCS 110 @ 1000° C.
Figure 20:
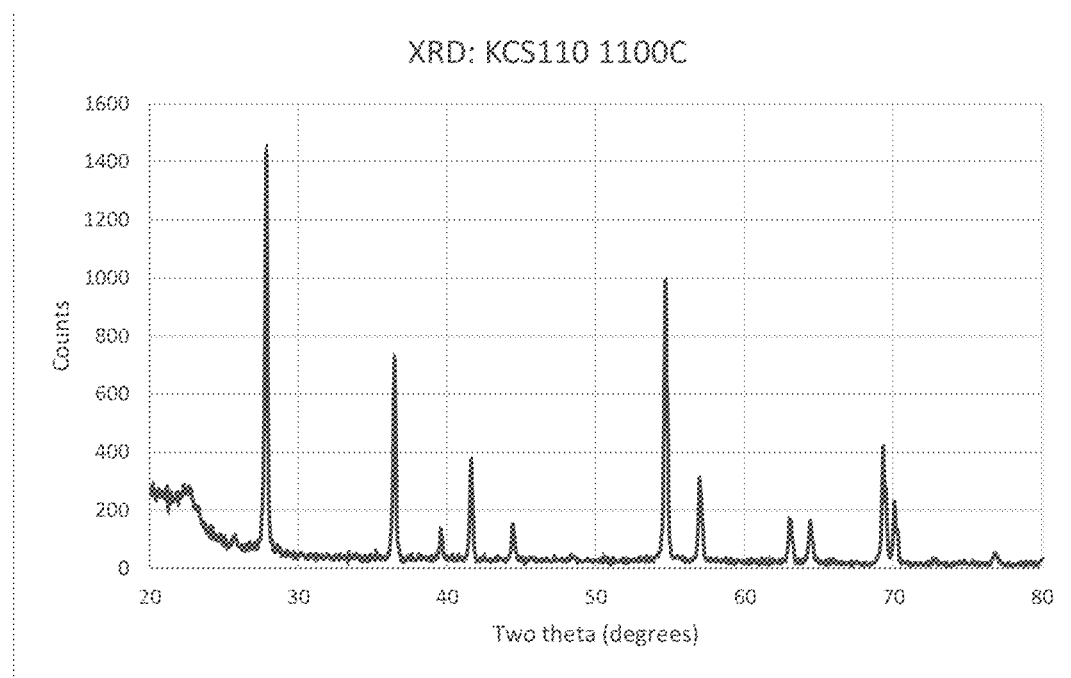
FIG. 20 is an XRD spectrum of KCS 110 @ 1100° C.

KCS110 consisted entirely of anatase at 700° C. (FIG. 16) and 900° C. (FIG. 17), while at 950° C. (FIG. 18), the majority phase was rutile. A small minority of anatase was present at 1000° C. (FIG. 19) and at 1100° C. (FIG. 20), the only phase detected was rutile. The peak resolution increased between 700° C. and 900° C. It is not clear whether this was due to the elimination of a small quantity of residual amorphous material, or reduced peak spreading caused by grain growth.

KCS111

Figure 21:
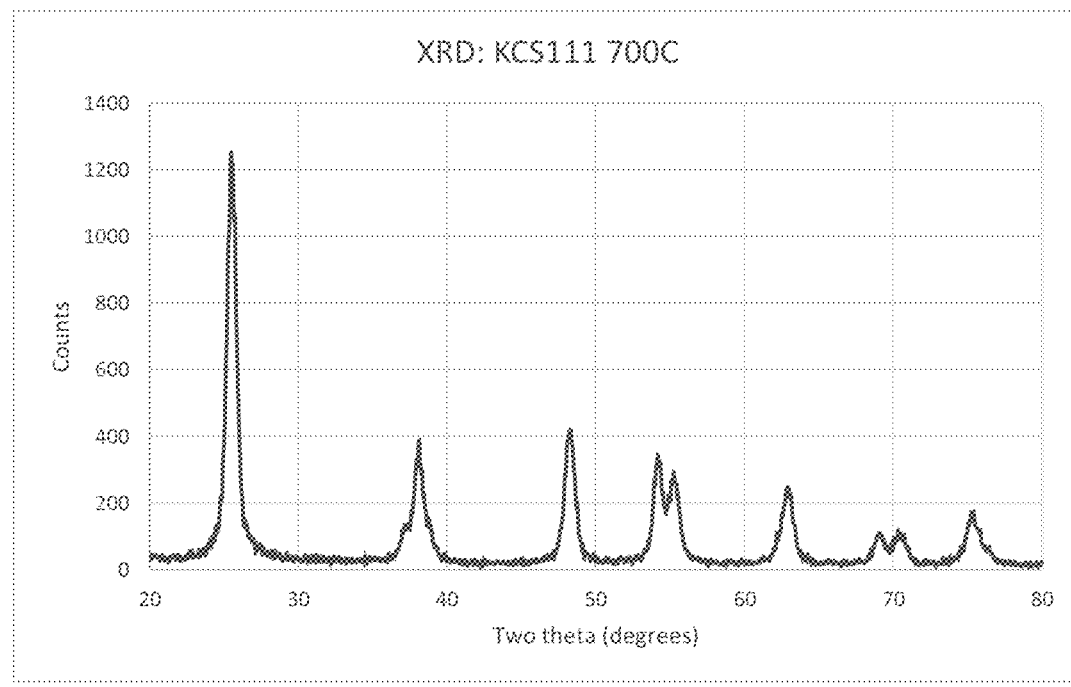
FIG. 21 is an XRD spectrum of KCS 111 @ 700° C.
Figure 22:
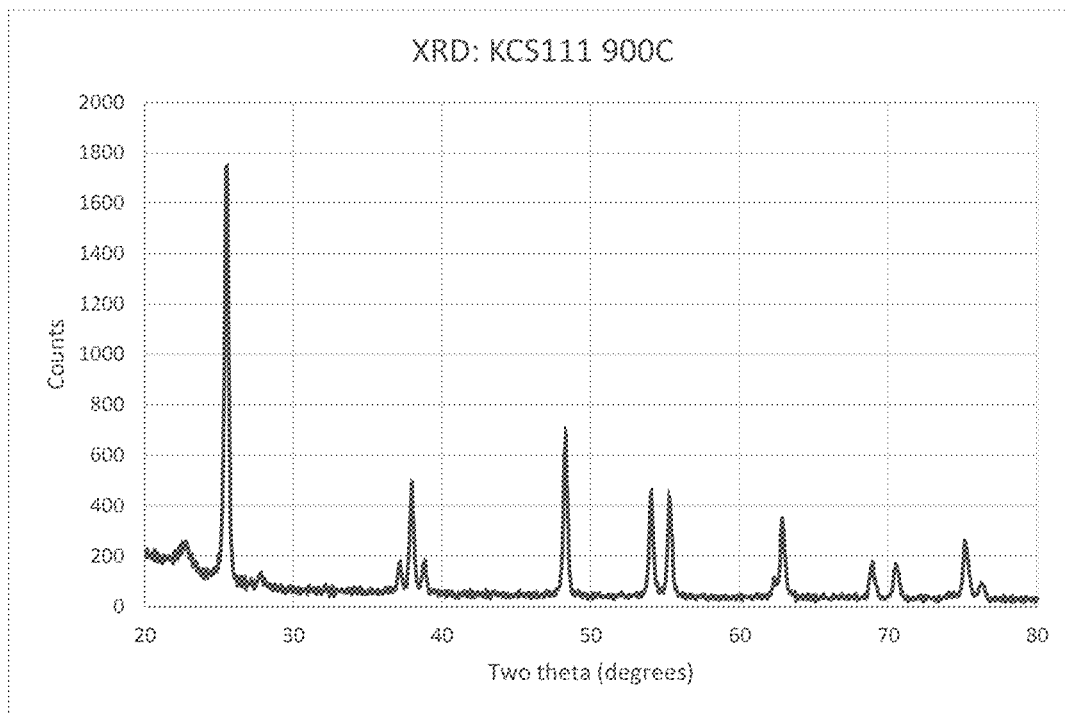
FIG. 22 is an XRD spectrum of KCS 111 @ 900° C.
Figure 23:
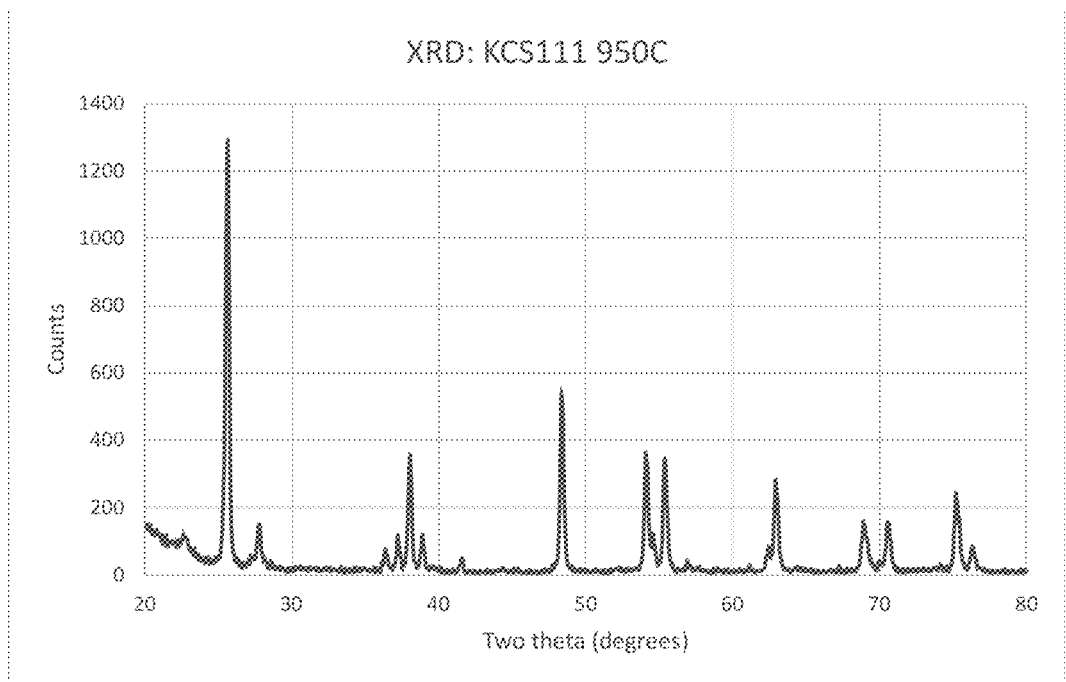
FIG. 23 is an XRD spectrum of KCS 111 @ 950° C.
Figure 24:
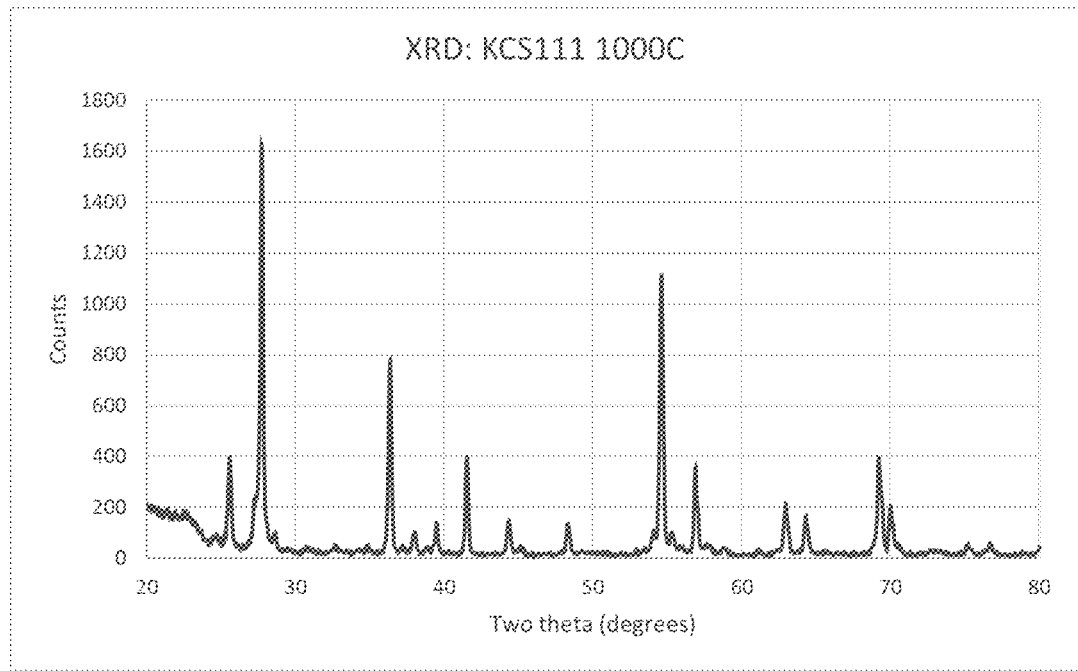
FIG. 24 is an XRD spectrum of KCS 111 @ 1000° C.
Figure 25:
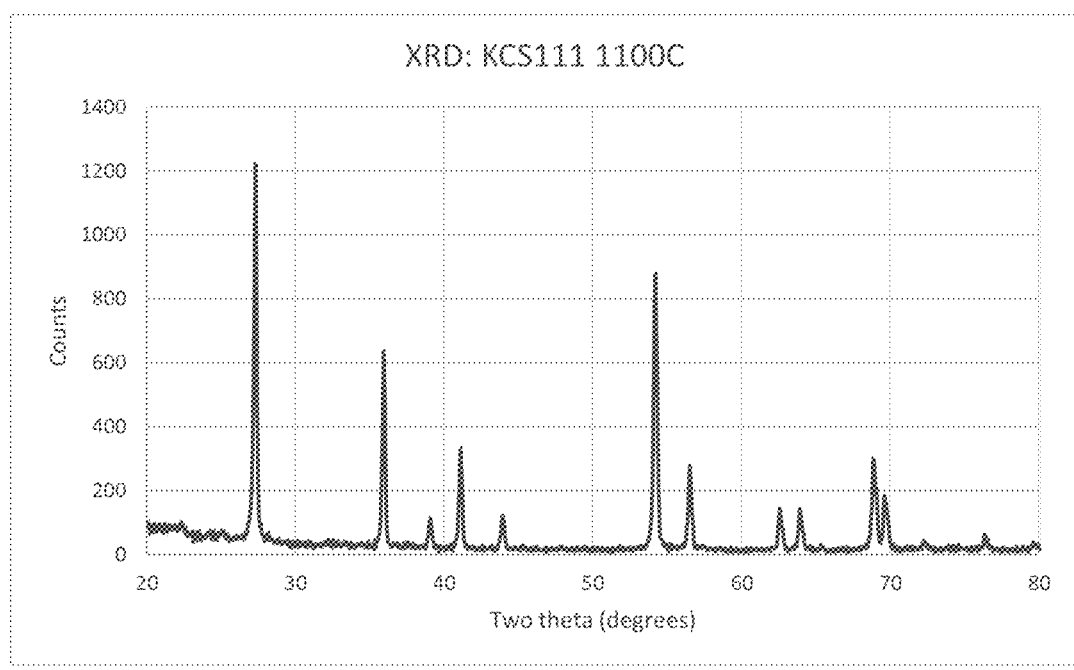
FIG. 25 is an XRD spectrum of KCS 111 @ 1100° C.

As was the case with KCS110, KCS111 was composed entirely of anatase at 700° C. (FIG. 21) and 900° C. (FIG. 22), but at 950° C. (FIG. 23), anatase remained the majority component, with only a small proportion of rutile, in approximately the reverse proportion to that seen in KCS110. After heating to 1000° C. (FIG. 24), only a small fraction of anatase remains and at 1100° C. (FIG. 25), the sample is entirely rutile.

KCS112

Figure 26:
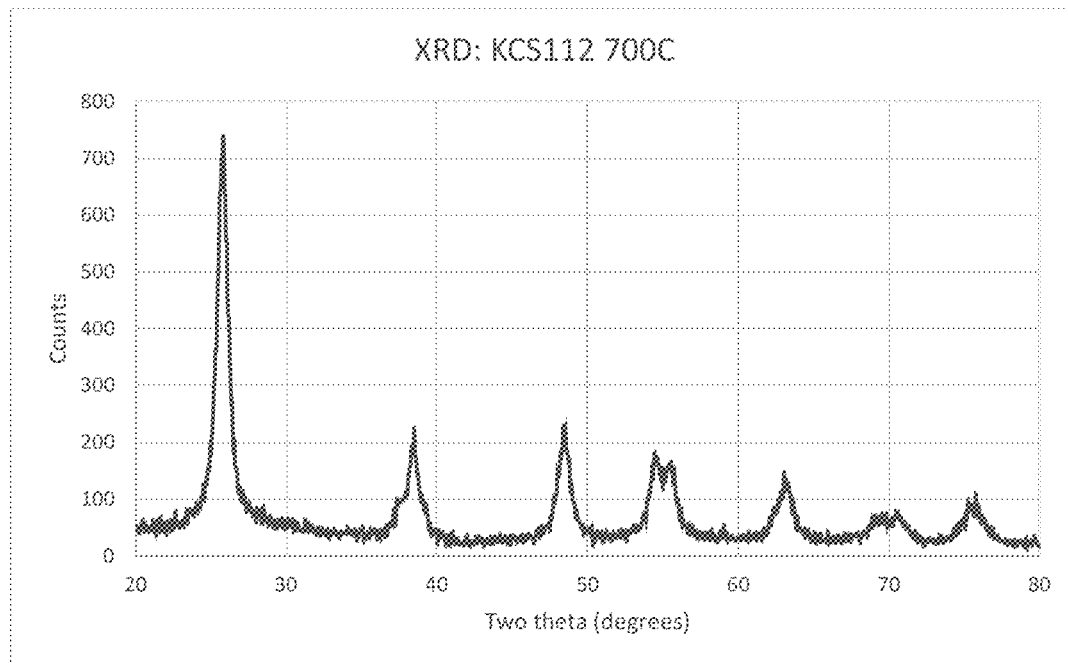
FIG. 26 is an XRD spectrum of KCS 112 @ 700° C.
Figure 27:
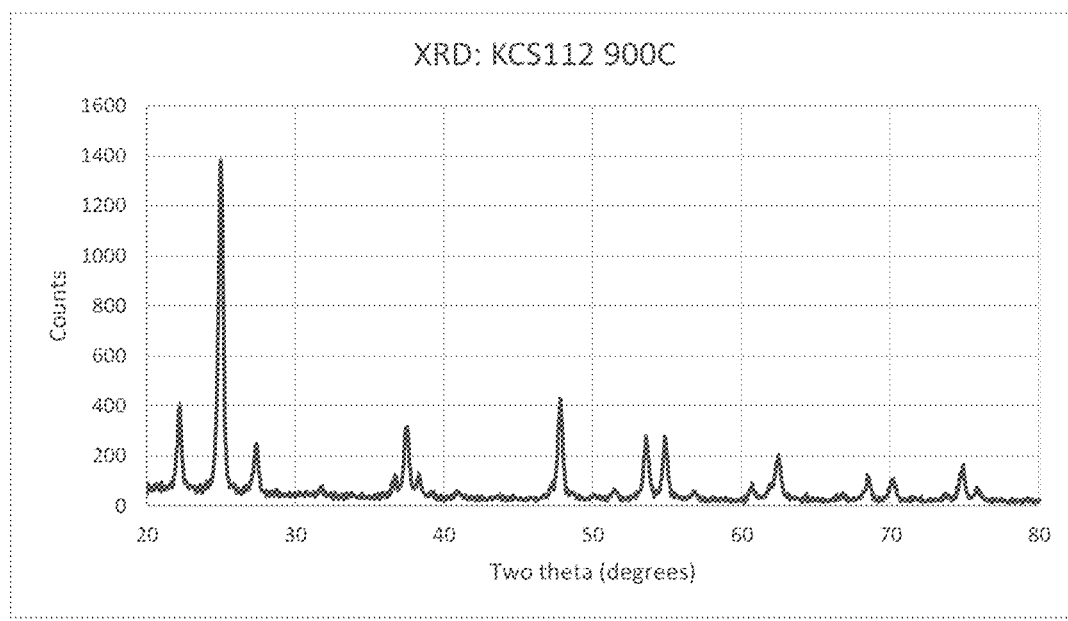
FIG. 27 is an XRD spectrum of KCS 112 @ 900° C.
Figure 28:
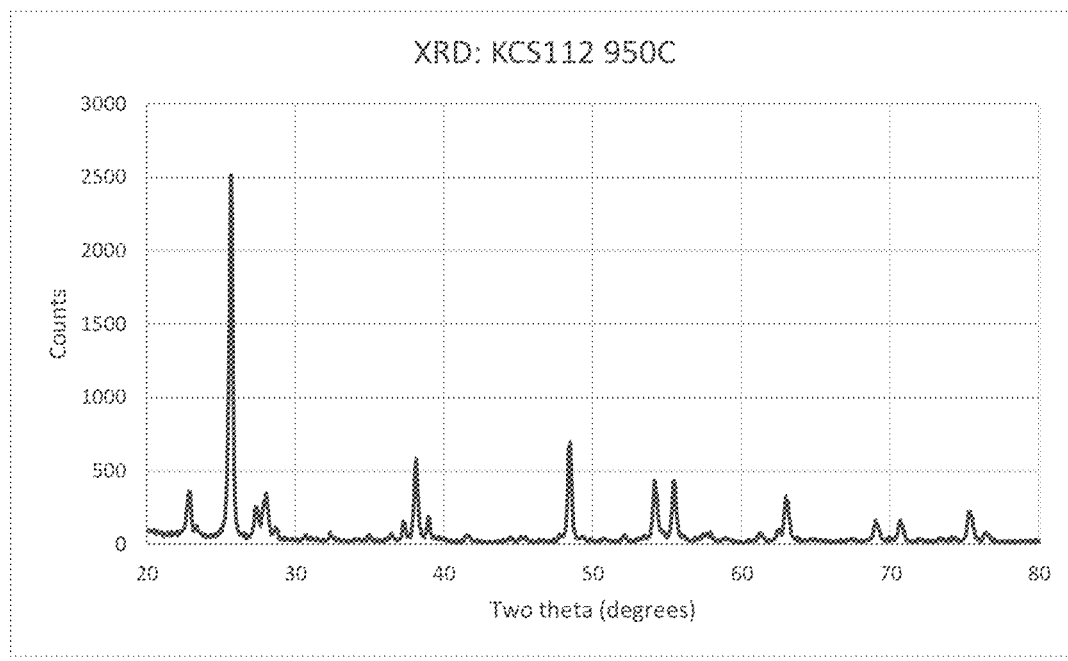
FIG. 28 is an XRD spectrum of KCS 112 @ 950° C.

After heating to 700° C. (FIG. 26), KCS112 appears to be composed of anatase, but the spectrum shows substantially more peak spreading than was the case for KCS110 or KCS111. After heating to 900° C. (FIG. 27), associated with the anatase structure are more clearly defined, but a second phase is clearly present. It has not yet been established whether this is a phosphorus oxide, or a titanium phosphate. At 950° C. (FIG. 28), the spectrum continues to evolve, with peaks consistent with a composition containing at least three phases, anatase, rutile and the third phase that was appearing at 900° C.

Figure 29:
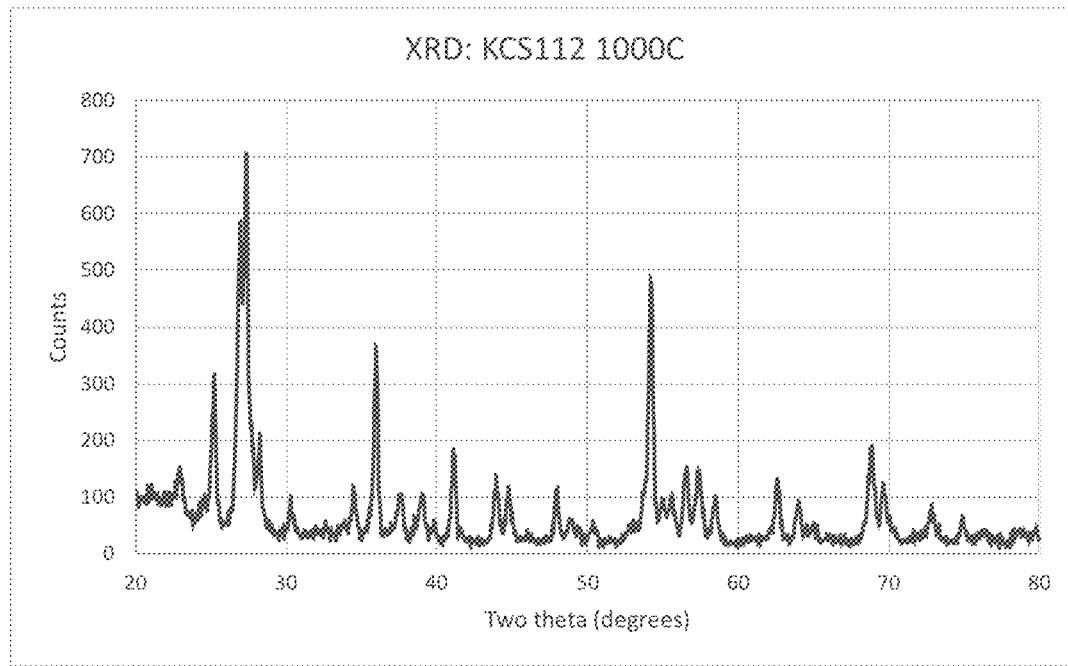
FIG. 29 is an XRD spectrum of KCS 112 @ 1000° C.
Figure 30:
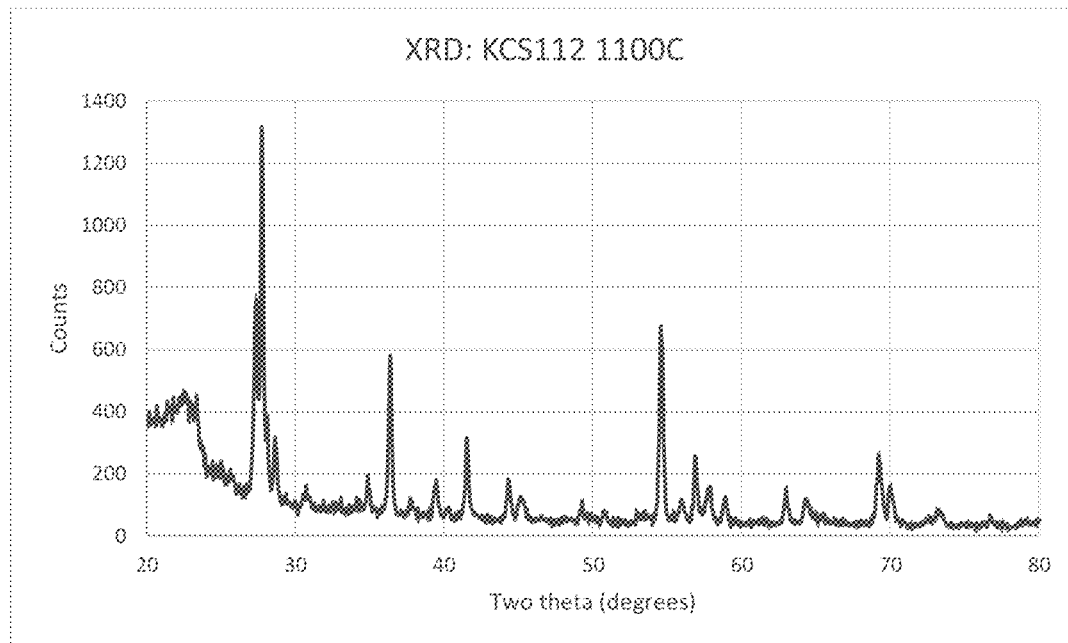
FIG. 30 is an XRD spectrum of KCS 112 @ 1100° C.
Figure 31:
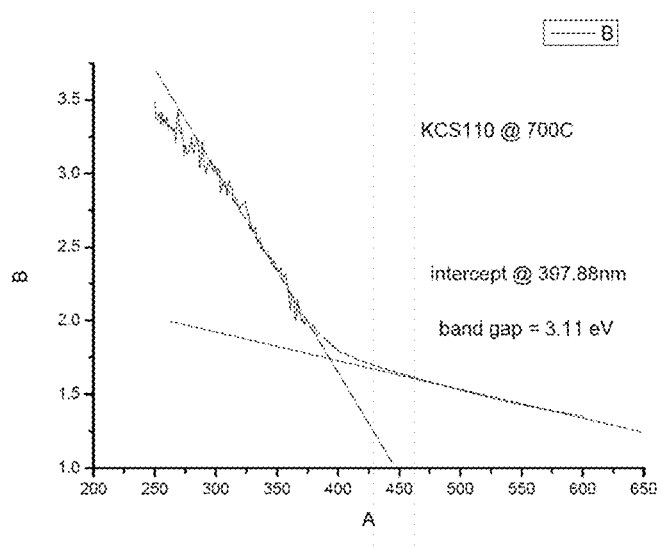
FIG. 31 is a UV spectrum of KCS 110 @ 700° C.
Figure 32:
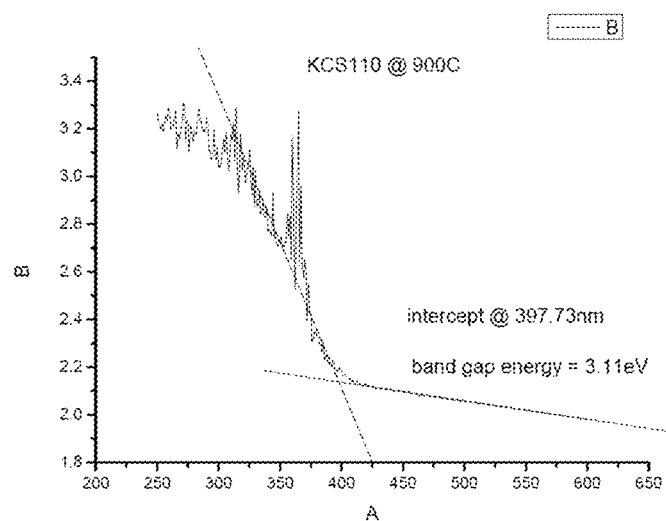
FIG. 32 is a UV spectrum of KCS 110 @ 900° C.
Figure 33:
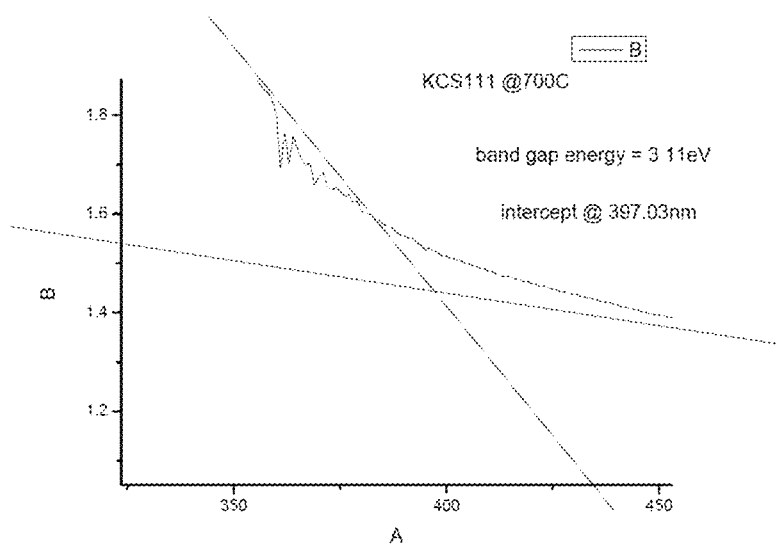
FIG. 33 is a UV spectrum of KCS 111 @ 700° C.
Figure 34:
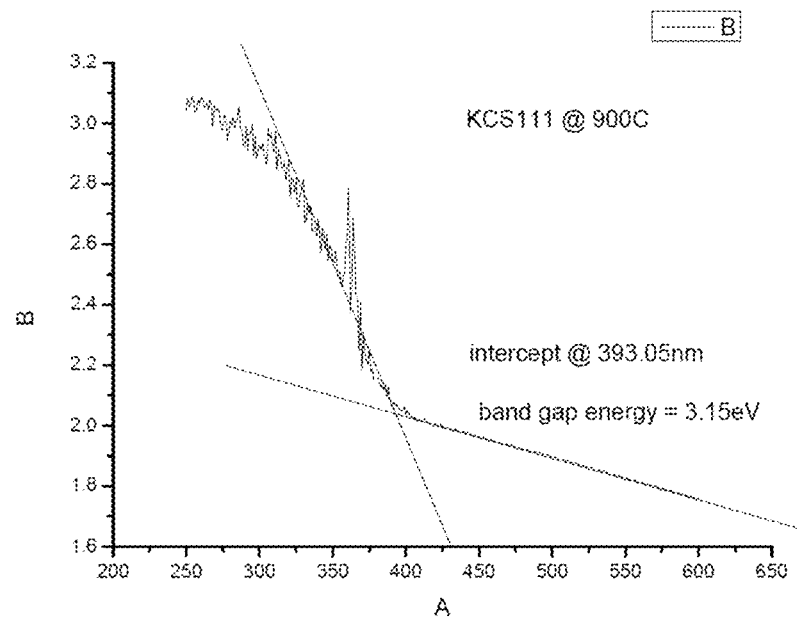
FIG. 34 is a UV spectrum of KCS 111 @ 900° C.
Figure 35:
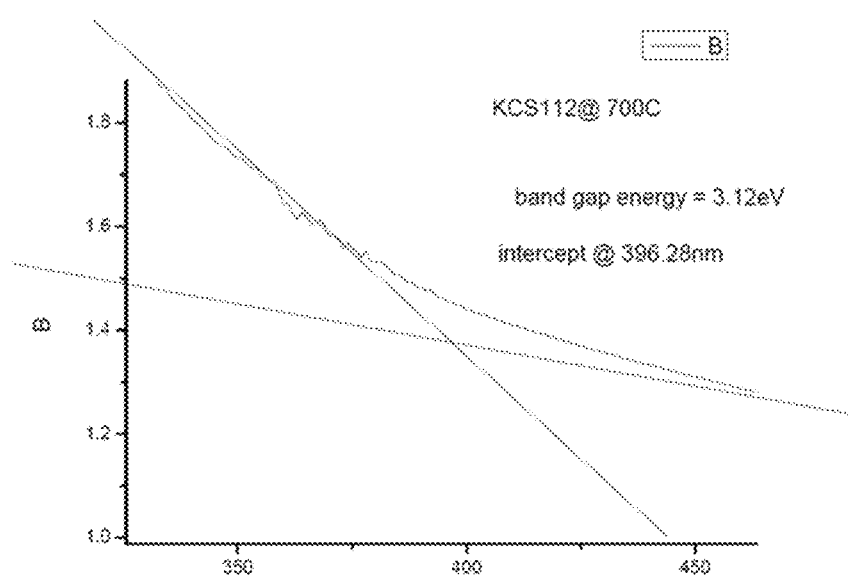
FIG. 35 is a UV spectrum of KCS 112 @ 700° C.
Figure 36:
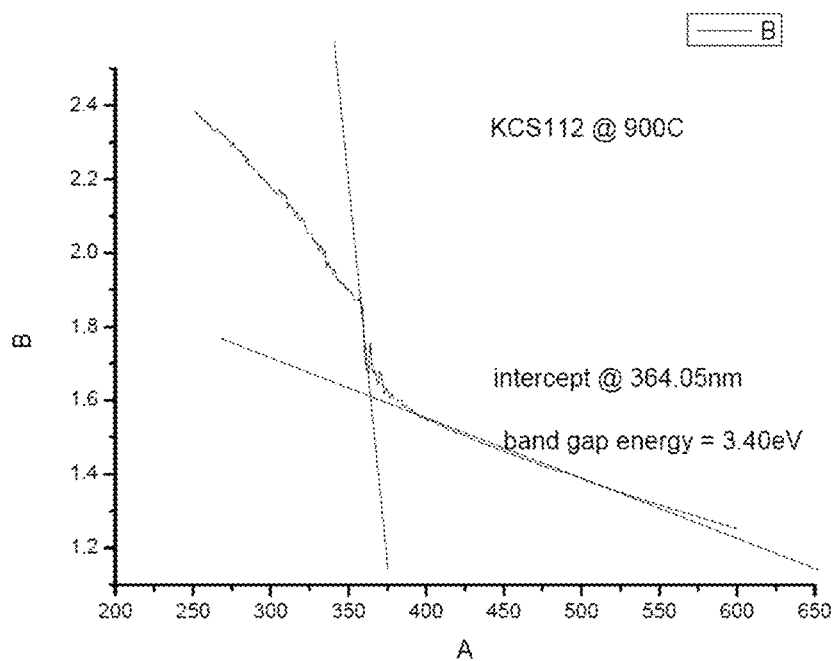
FIG. 36 is a UV spectrum of KCS 112 @ 900° C.
Figure 37:
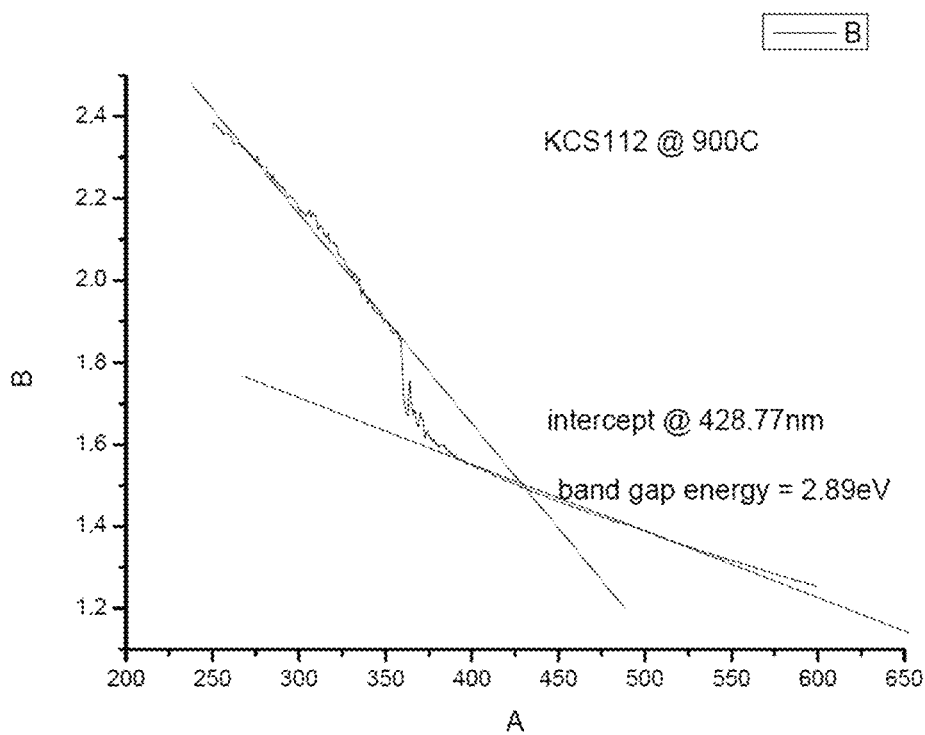
FIG. 37 is a UV spectrum of KCS 112 @ 900° C.—extrapolated intercept of the V absorption range into the visible range.
Figure 38:
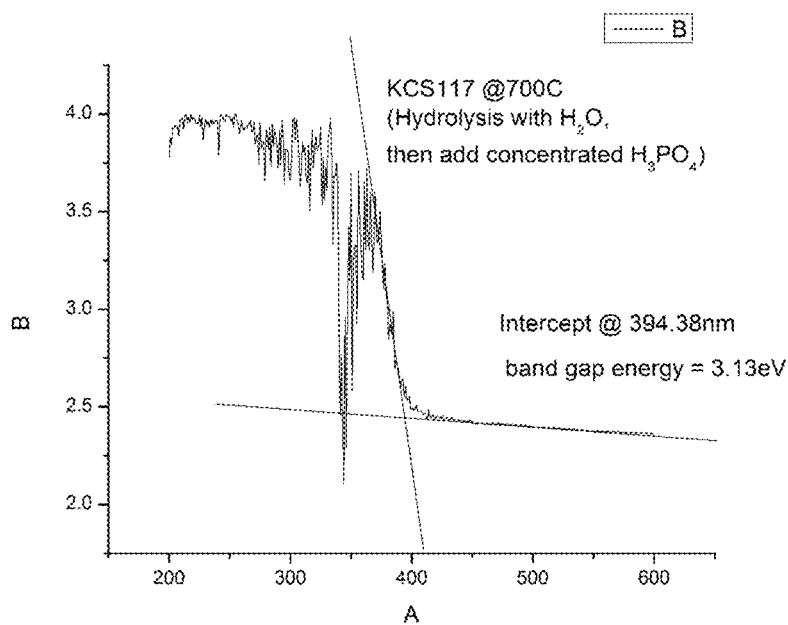
FIG. 38 is a UV spectrum of KCS 117 @ 700° C.
Figure 39:
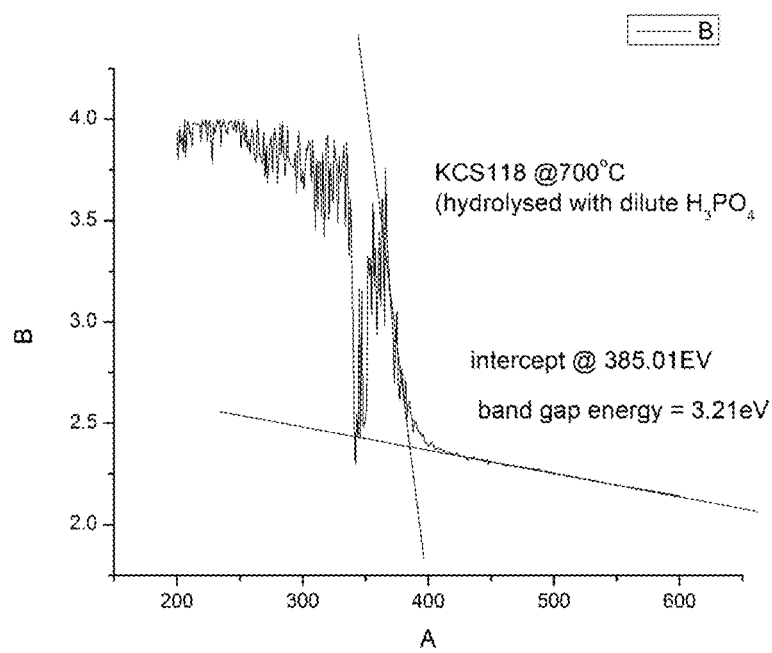
FIG. 39 is a UV spectrum of KCS 118 @ 700° C.

At 1000° C. (FIG. 29), the spectrum is overly complex. A multitude of peaks, many of which were not present at 950° C., indicates that as well as rutile and a small fraction of anatase, there are at least two other phases present. Given the composition of the powder, it is reasonable to postulate that these are a mixture of titanium phosphates. After heating to 1100° C. (FIG. 30), the spectrum is simpler again, with peaks indicating that the sample contains only rutile and one or more titanium phosphates, distinct from the phase that formed at 900° C.

UV-Visible Spectroscopy and Band Gap Calculations

Samples were prepared for UV-visible spectroscopy, by mixing approximately 1% of the powders calcined at 700° C. and 900° C. in dry potassium bromide, grinding to a fine powder and pressing into discs in a 13 mm pellet die. Spectra (FIGS. 31-37) were collected in transmission mode over a range of 600 nm to 250 nm, using a Shimadzu 1800 spectrophotometer. Spectra were plotted as a function of absorbance against wavelength and band gap energies were calculated by fitting tangents to the high transparency part of the spectrum in visible wavelengths and the range over which the material underwent a transition from transparent to opaque. The wavelength $\lambda$, at the intersection of the two tangents was taken as the onset of the transition from transparent to opaque and the band gap energy calculated from the formula $e=\lambda/1236$, where 1236=hc.

Results are Given in the Table 4 Below.

TABLE 4

UV-Visible Spectroscopy and band gap calculations

| Temp. (° C.) | KCS110 | | KCS111 | | KCS112 | | KCS117 | | KCS118 | |
|---|---|---|---|---|---|---|---|---|---|---|
| | Absorption edge wavelength nm | Band gap energy eV | Absorption edge wavelength nm | Band gap energy eV | Absorption edge wavelength nm | Band gap energy eV | Absorption edge wavelength nm | Band gap energy eV | Absorption edge wavelength nm | Band gap energy eV |
| 700° C. | 397.88 | 3.11 | 397.03 | 3.11 | 396.28 | 3.12 | 394.38 | 3.13 | 385.01 | 3.21 |
| 900° C. | 397.73 | 3.11 | 393.05 | 3.15 | 364.05 | 3.40 | | | | |
| | | | | | *428.77 | *2.89 | | | | |

*KCS112 showed a spectrum in which the absorbance increased by approximately 0.4 over a range of 20 nm, then continued to increase smoothly and gradually in the UV range. This value is the extrapolated intercept of this UV absorption range into the visible range.

Examples with reduced acetic acid P-doped process with dispersants:

Two formulations were prepared, using a reduced quantity of acetic acid, combined with a polymeric dispersant. The purpose of making these formulations was to determine whether a stable, dispersed sol could be made, which had a pH as close to 7.0 as possible and at least greater than 3.0. This was intended to yield a product which was subject to less stringent transport controls than the known product and which needed less stringent exposure control measures during use.

Figure 40:
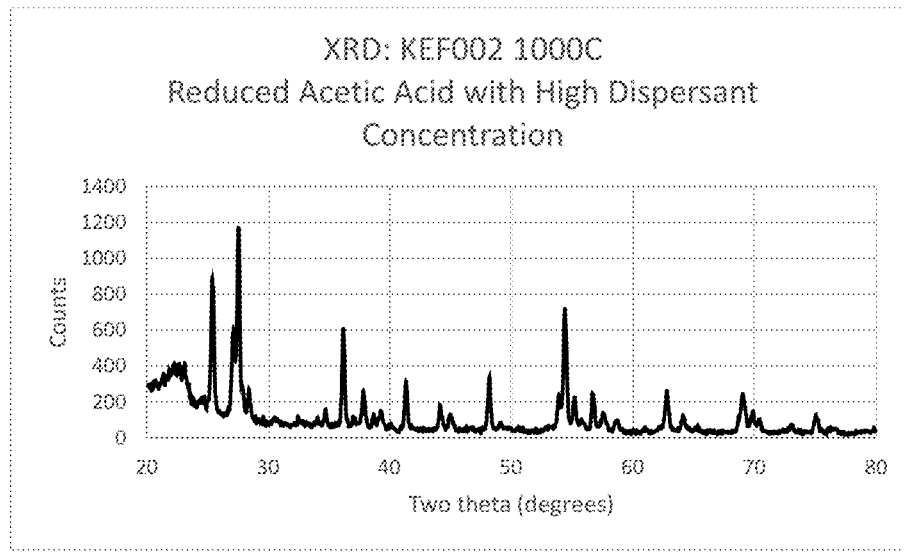
FIG. 40 is a UV spectrum of KEF002 @1000° C.
Figure 41:
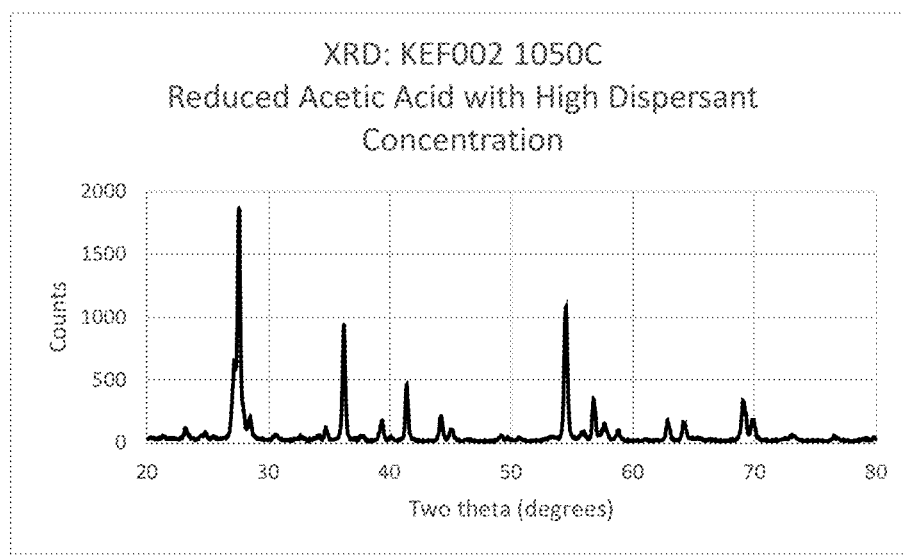
FIG. 41 is a UV spectrum of KEF002 @1050° C.
Figure 42:
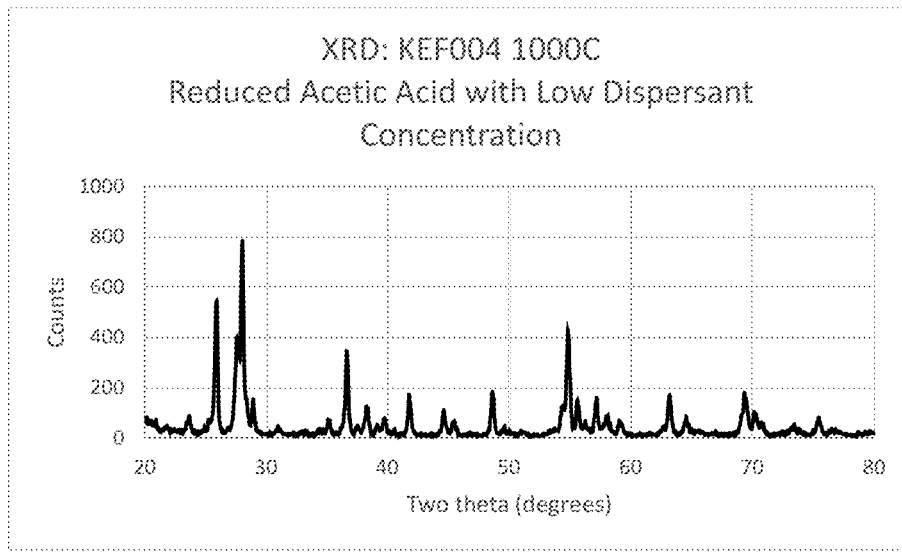
FIG. 42 is a UV spectrum of KEF004 @1000° C.
Figure 43:
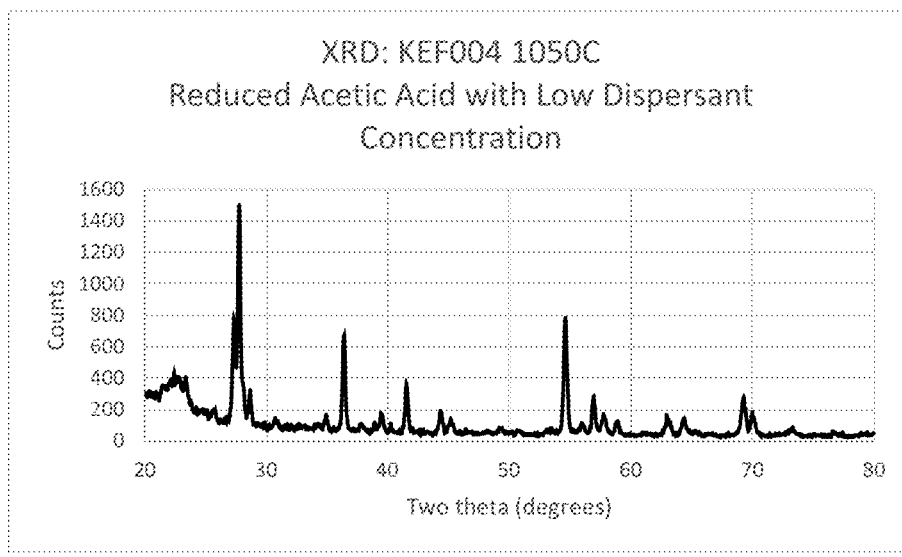
FIG. 43 is a UV spectrum of KEF004 @1000° C.

The two formulations, recorded as KEF002 and KEF004 were prepared according to the following process steps:
The relevant spectra are shown in accompanying FIGS. 40 to 43, inclusive, in which:
FIG. 40 is a UV spectrum of KEF002 @1000° C.;
FIG. 41 is a UV spectrum of KEF002 @1050° C.;
FIG. 42 is a UV spectrum of KEF004 @1000° C.; and
FIG. 43 is a UV spectrum of KEF004 @1050° C.

KEF002:
5. 5 mL titanium tetraisopropoxide (TTIP) was placed in a polypropylene beaker.
6. 7.5 mL glacial acetic acid was added while stirring.
7. 0.085 mL 86% orthophosphoric acid (aqueous) was added while stirring.
8. 1 mL BYK Disperbyk 180 polymeric dispersant was added while stirring
9. 90 mL deionised water was added while stirring and the mixture stirred for a further 40 minutes, to form a white, hazy suspension, which was then bottled.

KEF004:
1. 5 mL titanium tetraisopropoxide (TTIP) was placed in a polypropylene beaker.
2. 7.5 mL glacial acetic acid was added while stirring.
3. 0.085 mL 86% orthophosphoric acid (aqueous) was added while stirring.
4. 0.2 mL BYK Disperbyk 180 polymeric dispersant was added while stirring
5. 90 mL deionised water was added while stirring and the mixture stirred for a further 40 minutes, to form a white, hazy suspension, which was then bottled.

Both of these formulations, KEF002 and KEF004, were viscous white suspensions, with a small quantity of residual hard aggregates. These aggregates formed as a precipitate early in the hydrolysis, the majority of which redispersed during stirring, but a small quantity of which remained undispersed.

The dispersant was added to the non-aqueous reagents before hydrolysis to allow it to bond to the titania particles as soon after formation as possible, since performing the hydrolysis in mixtures with low acid concentrations or neutral pH was found to produce a highly aggregated suspension and adding the dispersant after completing the hydrolysis had not produced finely dispersed sols.

The pH of each suspension was measured, the results being:
KEF002 pH3.3
KEF004 pH2.9

These results are consistent with the dispersant having amine-terminated functional groups that bond the dispersant's polymeric backbone to the titania surface.

Samples of these formulations, KEF002 and KEF004, were dried in crucibles on hotplates at 200° C. and then calcined at 1000° C. and 1050° C. for 1 hour. The calcined powders were then analysed by XRD.

Both formulations contained a mixture of anatase and rutile after calcination at 1000° C., with the majority of the material being rutile, but a substantial minority, approximately 20 to 30% being retained anatase. After calcination at 1050° C., KEF002 consisted almost entirely of rutile. Small peaks indicated the presence of another phase, but there was no evidence of retained anatase. The spectrum of KEF004 attached in FIG. 43, calcined at the same temperature of 1050° C. showed that it was also predominantly rutile, with small peaks consistent with a minimal amount of retained anatase, near the detection limit and a third phase forming the balance.

As can be seen and, as is evidenced by the above discussion and attached Figures, the present invention provides a process comprising an anionic dopant source that provides several simultaneous advantages over known formulations.

Firstly, by using a non-volatile dopant source, phosphoric acid, in place of trifluoroacetic acid, the doping efficiency is much improved, as practically none of the dopant source is lost during the coating process and it is instead incorporated into the titanium dioxide matrix.

It has surprisingly been found by the inventors that the introduction of phosphorus for fluorine as a dopant increases the anatase to rutile transformation by between 50° C. and 100° C., while still maintaining the reduction in bandgap energy that brings the longest effective light wavelength for photocatalysis into the violet part of the visible spectrum. Equally, there was an increase in pH from 1.1 to over 3.0 which makes the formulation less acidic.

The level of phosphorus doping provided by the present invention defines the advantageous technical effect that the band gap energy is shifted into the visible part of the spectrum, the anatase to rutile transformation temperature is increased and the formation of titanium phosphates is avoided and the doping method of the present invention has the surprising technical advantage of promoting uniform doping in a stable nanoparticulate sol, suitable for preparing robust, transparent coatings.

The words comprises/comprising when used in this specification are to specify the presence of stated features, integers, steps or components but does not preclude the presence or addition of one or more other features, integers, steps, components or groups thereof.

The invention claimed is:

1. A process for the preparation of an antimicrobial coating composition, the process comprising the steps of:
    preparing a coating solution by
    (i) mixing a chelating agent with a titanium alkoxide and a phosphorylating agent,
    wherein the phosphorylating agent is orthophosphoric acid, and wherein the amount of orthophosphoric acid used is in the range of 0.0001 to 1 wt %, based on the total weight of the coating composition; and
    (ii) adding an aqueous solution to the mixture formed from step (i); optionally
    wherein the aqueous solution is added in step (i) instead of step (ii) and step (ii) comprises the addition of the phosphorylating agent wherein the phosphorylating agent is added in step (ii) instead of step (i).

2. The process of claim 1, wherein the chelating agent is a carboxylic acid selected from the group consisting of formic acid, propionic acid, butanoic acid and acetic acid.

3. The process of claim 2, wherein the carboxylic acid is acetic acid in the form of glacial acetic acid, and wherein the amount of glacial acetic acid used is in the range 12 to 18 wt %, based on the total weight of the coating composition.

4. The process of claim 1, wherein the titanium alkoxide is selected from the group consisting of titanium isopropoxide, titanium ethoxide, titanium methoxide and titanium butoxide.

5. The process of claim 4, wherein the titanium alkoxide is titanium isopropoxide, and wherein the amount of titanium isopropoxide used is in the range 4 to 15 wt % of the coating composition.

6. The process of claim 1, wherein the amount of orthophosphoric acid used is in the range 0.0002 to 0.005 wt %, based on the total weight of the coating composition.

7. The process of claim 1, wherein the amount of water in the aqueous solution is in the range of 30 wt % to 99.5 wt %, based on the total weight of the coating composition.

8. The process of claim 7, wherein the aqueous solution comprises an organic solvent in an amount up to 20% by weight of the aqueous solution.

9. The process of claim 1, comprising the step of, after step (ii), (iii) the addition of a dispersing agent.

10. A process for making an antimicrobial powder comprising the initial step of preparing a solution in accordance with claim 8, evaporating the solvents from the coating solution and then annealing the residue from the solvents at a temperature between 300° C. and 1400° C. to form an antimicrobial powder.

11. A method of preparing an antimicrobial coating composition comprising the step of mixing the antimicrobial powder as prepared by the process of claim 10 with the coating solution.

12. An antimicrobial coating composition obtained by the process of claim 11.

13. The antimicrobial coating composition of claim 12, wherein the antimicrobial coating composition exhibits antimicrobial activity under both UV and visible light and in reduced light.

14. A coated substrate comprising:
    a substrate; and
    an antimicrobial coating prepared by the process of claim 11, wherein the antimicrobial coating is coated on the substrate.

15. The coated substrate of claim 14, wherein the substrate is selected from the group consisting of glass and glass-based composite materials, ceramics, plastic, cement and clay.

16. The coated substrate of claim 15, wherein the substrate further comprises a metal.

* * * * *